United States Patent [19]

Leon et al.

[11] Patent Number: 4,996,880
[45] Date of Patent: Mar. 5, 1991

[54] OPERATING TURBINE RESONANT BLADE MONITOR

[75] Inventors: Robert L. Leon, Roslyn, Pa.; David H. Powell, Medford, N.J.

[73] Assignee: Electric Power Research Institute, Inc., Palo Alto, Calif.

[21] Appl. No.: 327,556

[22] Filed: Mar. 23, 1989

[51] Int. Cl.$^5$ ............................................. G01M 15/00
[52] U.S. Cl. ...................................... 73/660; 73/118.1
[58] Field of Search ...................... 73/660, 118.1, 602; 364/508

[56] References Cited

U.S. PATENT DOCUMENTS 3,597,963 8/1971 Smejkal .................................. 73/660
4,422,333 12/1983 Leon ...................................... 73/660

Primary Examiner—Jerry W. Myracle
Attorney, Agent, or Firm—Leonard Bloom

[57] ABSTRACT

An operating turbine monitor is described incorporating one or more acoustic sensors positioned next to a blade row of a rotor, an analog digital converter, a tachometer sensor at the rotor shaft, a memory, a synchronous averaging circuit, a subtractor circuit, and a comparator. The invention overcomes the problem of monitoring an operating tubine for order-related turbine blade vibration and for non order-related turbine blade vibration as well as for other turbine conditions.

60 Claims, 11 Drawing Sheets

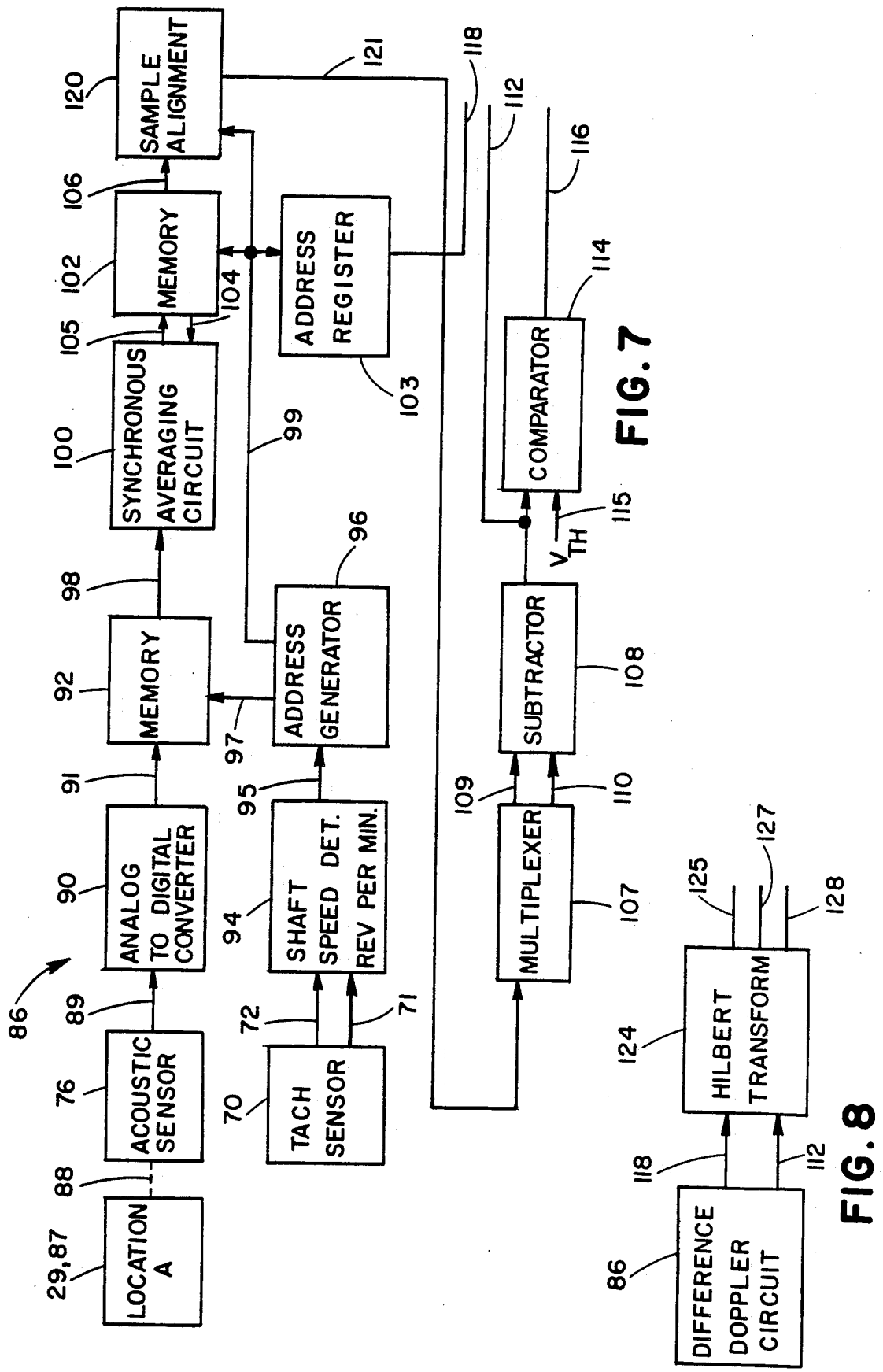

OPERATING TURBINE RESONANT BLADE MONITOR

BACKGROUND OF THE INVENTION

1. Field of the Invention

This invention relates to monitoring the vibration of turbine blades in an operating turbine and more particularly to detecting and locating resonantly vibrating turbine blades.

2. Description of the Prior Art

In U.S. Pat. No. 4,422,333 by R. L. Leon, the inventor herein, and which issued on Dec. 27, 1983, a method and apparatus was described for detecting and identifying one or more excessively vibrating blades of the rotating portion of a turbomachine. An acoustic sensor was positioned to receive a characteristic Doppler waveform that resulted when a blade or blade group vibrates resonately at an order of running speed. The method described in the '333 patent for constant speed turbines, involved synchronous averaging out the non order-related background noise followed by editing or blanking out the few order related components known to be contaminated with background error such as blade passing frequency and once-per-revolution and twice-per-revolution frequencies. The resulting signal is then displayed to reveal the characteristic Doppler waveform of the blade vibrations. An envelope detection technique was employed to accurately pick out the amplitude peak indicative of the location of the resonant blade. It was discovered that in some steam power turbines the order related background error was not limited to just a few order-related components, but instead was spread broadly across all the order related components. Blanking all of the offending order-related background components would, of course, eliminate entirely the sought after Doppler waveform.

SUMMARY OF THE INVENTION

In accordance with the present invention, a method and apparatus is provided for detecting a resonantly vibrating blade attached to the shaft of a rotating rotor in an operating turbine comprising an acoustic sensor positioned on a stationary member with respect to the rotor to receive sound waves emanating from the vibrating blade of the rotor as the blade rotates about its rotor axis and to provide an acoustic signal from the received sound waves, the acoustic sensor positioned with respect to the rotor so that the blade approaches and departs from the acoustic sensor in the course of one rotation of the rotor about the rotor axis thereby imparting a Doppler effect to the received sound waves, a sensor for obtaining a reference signal indicative of rotor position at least once each time the rotor completes a revolution about the rotor axis to provide an indication of angular velocity of the rotor for each revolution, an analog to digital converter for sampling the acoustic signal to obtain samples during each revolution of a plurality of revolutions of the rotor including at least some revolutions at a first and a second angular velocity of the rotor, a circuit or digital computer for averaging the amplitude and taking into account the polarity of the samples obtained at respective rotor positions within each revolution of the rotor revolving at the first angular velocity and for separate averaging the amplitude and taking into account the polarity of the samples within each revolution of the rotor revolving at the second angular velocity, a circuit or digital computer for subtracting the amplitudes and taking into account the polarity of averaged samples obtained at respective rotor positions of the rotor revolving at the first and at the second angular velocity to provide a difference Doppler signal at respective rotor positions of the rotor whereby order-related background noise due to other blades having nonuniformity in angular position on the rotor is removed, and a circuit for comparing the amplitude of the difference Doppler signal at respective rotor positions of the rotor with a threshold value whereby an amplitude above the threshold value are indicative of the resonantly vibrating blade.

The invention further provides a method and apparatus for detecting a resonantly vibrating blade attached to the shaft of a rotating rotor in an operating turbine comprising two acoustic sensors spaced apart from one another, each positioned on a stationary member with respect to the rotor to receive sound waves emanating from the vibrating blade of the rotor as the blade rotates about its rotor axis and to provide an acoustic signal from the received sound waves, each acoustic sensor positioned with respect to the rotor so that the blade approaches and departs from the acoustic sensor in the course of one rotation of the rotor about the rotor axis thereby imparting a Doppler effect to the received sound waves, a sensor for obtaining a reference signal indicative of rotor position at least once each time the rotor completes a revolution about the axis to provide an indication of angular velocity of the rotor for each revolution, a circuit or an analog to digital converter for sampling the acoustic signal at each sensor to obtain samples as a function of rotor position as the rotor makes a plurality of revolutions at a first and at a second angular velocity of the rotor, a circuit or computer for averaging the amplitude and taking into account the polarity of the samples at respective rotor positions at respective angular velocities at respective sensors, a circuit or computer for subtracting the averaged amplitude and taking into account the polarity of samples at respective rotor positions at respective sensors at said first angular velocity from a corresponding averaged sample at said second angular velocity to form a difference Doppler sample at each sensor at each respective rotor position, a circuit or computer for phase shifting or transforming the difference Doppler samples at one or at each sensor in time to correspond to the same location on the rotor at the samples were taken to provide transformed difference Doppler samples with respect to each sensor, a circuit or computer for subtracting amplitude normalized transformed difference Doppler samples of two sensors from each other corresponding to the same location on the rotor to provide a difference difference Doppler sample.

It is the object of the invention to use one acoustic sensor and at least two angular velocities of a nearly constant speed turbine to form a difference Doppler signal from averaged signals at each angular velocity.

It is a further object of the invention to use two acoustic sensors and two angular velocities to form a first difference Doppler signal from averaged signals at each sensor respectively and then to form a difference difference Doppler signal by subtracting the first difference Doppler signal at the two sensors to uncover low level Doppler waveforms in the presence of a much higher level geometry-sensitive order-related background waveform. The first difference Doppler signal at one sensor may be shifted in phase by the separation angle between the two sensors to correspond to the same location on the rotor and normalized in amplitude.

It is a further object of the invention to use a mathematical technique such as a Hilbert Transform to localize the maximum amplitude of the difference Doppler signal as well as the instantaneous frequency at the maximum amplitude of the difference Doppler signal indicative of the location and resonant frequency of the vibrating blade in the operating turbine.

It is a further object of the invention to utilize synchronous time records where each record, consisting, for example, of 64 samples or points, would be tagged with a label indicating the exact speed or angular velocity of the rotor shaft at the time of capture. The angular velocity may be in increments of 0.125 RPM over a range of ±1 RPM for a power turbine operating at 3600 RPM.

It is a further object of the invention to detect non order-related or fluttering turbine blades by processing the data obtained from many revolutions with the data obtained from a few revolutions.

It is a further object of the invention to detect non order-related aerodynamic events in an operating turbine such as condensation shock or rotating stall by processing the data obtained from one acoustic sensor sensed over many revolutions with the data obtained from one or more consecutive revolutions.

It is a further object of the invention to detect differential or uneven nozzle wear between two or more nozzle sections in the control stage or first stage of a high pressure turbine by positioning a dynamic pressure or acoustic sensor down stream of the rotating blade row downstream, behind each nozzle section and comparing the order-related signal from the same rotating blades by synchronous averaging the order-related signals to remove non order-related signals and phase shifting them for comparison in amplitude to provide an indication of differential nozzle wear.

It is a further object of the invention to detect and measure order-related resonant torsional shaft vibration which projects out into large tangential blade vibration at the blade tips.

It is a further object of the invention to detect order-related resonant torsional shaft vibration by obtaining the difference Doppler and then determining the variation in magnitude as a function of angular position of the shaft whereby a sine wave amplitude variation is indicative of resonant shaft vibration and the number of sine wave cycles within a revolution of the shaft corresponds to the number of orders of the torsional shaft vibration.

BRIEF DESCRIPTION OF THE DRAWINGS

FIG. 7 is one embodiment of the invention.

FIG. 8 is a first alternate embodiment of the invention.

DESCRIPTION OF THE PREFERRED EMBODIMENTS

Figure 1:
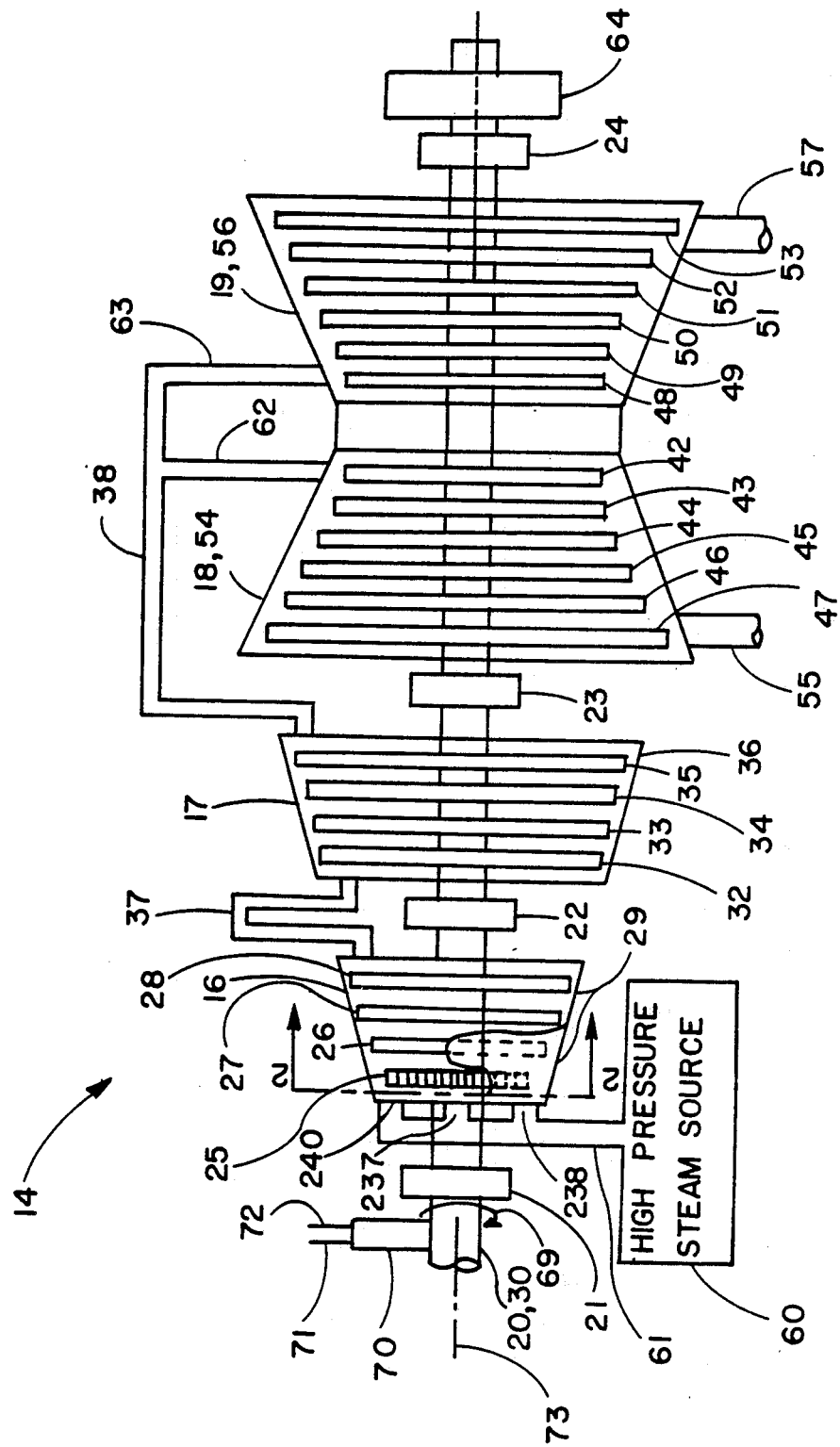
FIG. 1 is a pictorial and schematic diagram of a two flow tandem compound turbine.

Referring to FIG. 1, a pictorial and schematic diagram of a two flow tandem compound turbine 14 is shown. Compound turbine 14, as shown in FIG. 1, has a high pressure turbine 16, an intermediate pressure turbine 17 and two low pressure turbines 18 and 19 having a common shaft 20 which is cylindrical in shape for receiving and transmitting to a load, for example an electrical generator, torsional load forces and power. Shaft 20 is supported and held in place by bearings 21-24. Bearings 21-24 are held in place by suitable support fixture for holding bearings 21-24 firmly in place and supporting the weight on shaft 20 as well as shaft 20. Attached or secured to shaft 20 in high pressure turbine 16 are blade rows 25-28. Each blade row, for example blade row 25, comprises a plurality of blades, for example, 100, extending radially from shaft 20. A housing 29 encloses blade rows 25-28 as well as providing support for turbine nozzles and vanes for controlling and directing high pressure steam through high pressure turbine 16. Similarly, intermediate pressure turbine 17 has blade rows 32-35 which are enclosed by housing 36. Steam from high pressure turbine 16 is coupled to intermediate pressure turbine 17 by duct 37. Steam from intermediate pressure turbine 17 is coupled to low pressure turbines 18 and 19 by way of duct 38. Low pressure turbine 18 has blade rows 42-47 enclosed by housing 54 and has an exhaust duct 55. Low pressure turbine 19 has blade rows 48-53 enclosed by housing 56 which has an exhaust duct 57. The number of blade rows in turbines 16-19 may vary depending upon the turbine as well as the number of fixed vanes and inlet nozzles for distributing and controlling the steam entering and passing through the respective turbine. A high pressure steam source 60 provides high pressure steam, for example, at 1000 degrees centigrade and at 155 pounds per square centimeter (1000 pounds per square inch (psi)) which may pass over duct 61 into an inlet nozzle not shown within housing 29 of turbine 16. The steam passes through turbine 16 over duct 37 through turbine 17 over duct 38 where it divides. A portion of the steam passes over duct 62 through turbine 18 and out exhaust 55. The other portion of steam passes over duct 63 through turbine 19 and out exhaust duct 57.

Compound turbine 14 may operate in a power plant for producing electricity, for example, 60 hertz or 50 hertz alternating current by way of electrical generator 64. Shaft 20 may have an angular velocity of 3600 revolutions per minute or 1800 revolutions per minute (rpm) to produce 60 hertz alternating current from electrical generator 64. Alternately, shaft 20 may have an angular velocity of 3000 rpm or 1500 rpm to produce 50 hertz alternating current from electrical generator 64.

The angular velocity of shaft 20 may be determined by a tachometer sensor 70 having an output over leads 71 and 72. Tachometer sensor 70 may be positioned close to shaft 20 having an optical coupling such as by light to detect each revolution made by shaft 20. Shaft 20 may have a strip of reflective tape thereon or some other suitable means to communicate the position of the shaft 20 as it completes a revolution. Tachometer sensor 70 may be supported by the same support fixture that supports bearing 21 so that the position of tachometer sensor 70 remains fixed in relation to longitudinal axis 73 of shaft 20 and of rotor 30.

Figure 2:
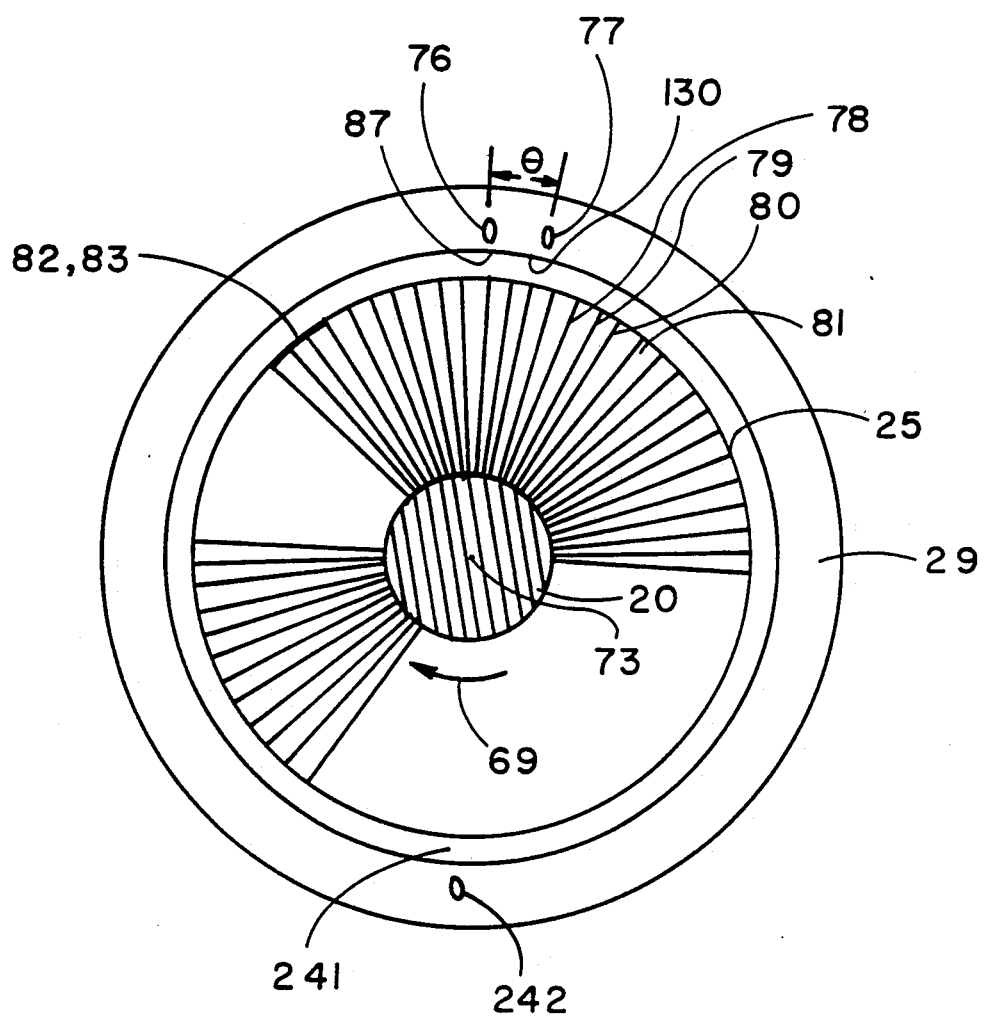
FIG. 2 is a cross section view along the lines 2-2 of FIG. 1.

Referring to FIG. 2, a cross sectional view of high pressure turbine 16 is shown to illustrate blade row 25 and two acoustic sensors 76 and 77 mounted through housing 29 to be positioned downstream of blade row 25 in locations 87 and 130 respectively. As many as 150 blades may be in a blade row. The ends of the blades may be free or they may be attached to a shroud at the end of the blade by means of a tenon passing there through and riveted over to form a blade group. Alternately, wires may extend through the blades to allow movement of the blades relative to one another but to dampen their vibration. FIG. 2 shows, for example, individual blades 78-81 and a blade group 82 of four blades 74, 75, 84 and 85 having a shroud 83 attached to the ends of the blades 74, 75, 84 and 85.

Acoustic sensors 76 and 77 are positioned with respect to blade row 25 so that the individual blades 78-81 or blade group 82 approaches and departs from the acoustic sensors 76 and 77 in the course of one rotation of shaft 20 about shaft axis 73 thereby imparting a Doppler effect to the received sound waves.

As blade row 25 shown in FIG. 2 rotates with shaft 20 as shaft 20 rotates (as shown by arrow 69) acoustic sensors 76 and 77 record certain acoustic signals. The acoustic signals are order related which are for the most part a function of the angular position of blade row 25 and reoccur each revolution of shaft 20. Examples of order-related signals are 1. blade row nonuniformity i.e. nonuniform blade wake caused by, for example, uneven spacing of the blades about shaft 20 and blade passing frequency and 2. an individual resonantly vibrating blade or blade group. The blades may be excited into resonance by the nozzle passing frequency which occurs when a plurality of nozzles discharge steam which impact on blade row 25 as blade row 25 is rotating at the operating or running speed, or by any integer multiple of running speed due to normal nonuniformities in the spacing between nozzle blades. Acoustic sensors 76 and 77 may have a separation angle with respect to the rotation of shaft 20 of about 9 degrees for good results. Order-related acoustic signals are a function of the rpm of shaft 20 and frequency harmonics of the running speed. Non order-related acoustic signals may be due to, for example, background noise of steam passing through turbine 16 or due to nonresonant vibrations of individual blades or blade groups for example at the natural vibration frequency of the blade.

Figure 3:
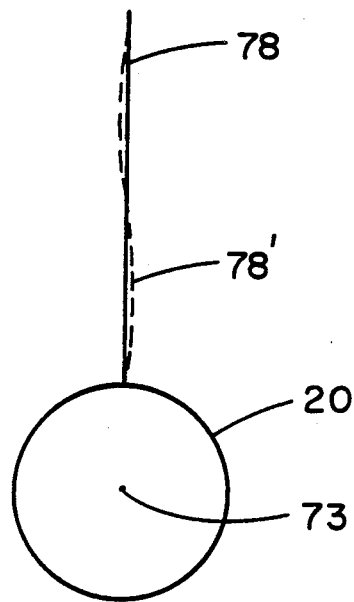
FIGS. 3 and 4 show one turbine blade of a blade row vibrating at a first and at a fourth resonant frequency respectively.

FIG. 3 shows an individual blade 78 on shaft 20 without vibration. Blade 78' is shown in FIG. 3 having a vibration at the natural frequency of the blade.

Figure 4:
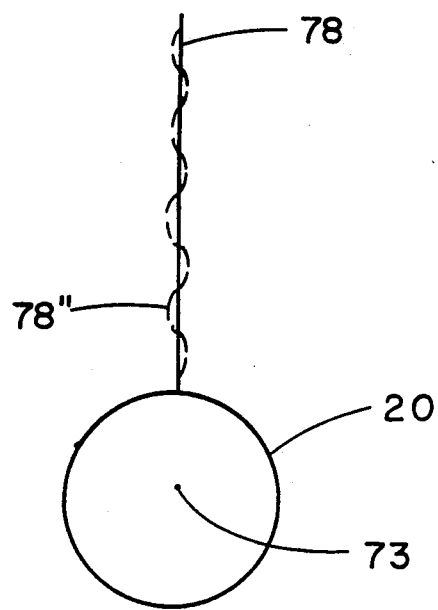

FIG. 4 shows blade 78 on shaft 20 without vibration. Blade 78" is shown in FIG. 4 having a vibration at a natural frequency four times that of FIG. 3.

Now if the natural frequency of the blade corresponded to an integral number of running speed then the vibration shown in FIGS. 3 and 4 would be order-related. Every time blade 78 passed sensor 77 and 76 the respective sensor would see the blade in exactly the same physical position (tangential deflection) with respect to the shaft position as shaft 20 rotates. If the vibration of blade 78 was not an integral number of times of the running speed then blade 78 would be in a different physical position each time it passed sensors 76 and 88 respectively.

Figure 5:
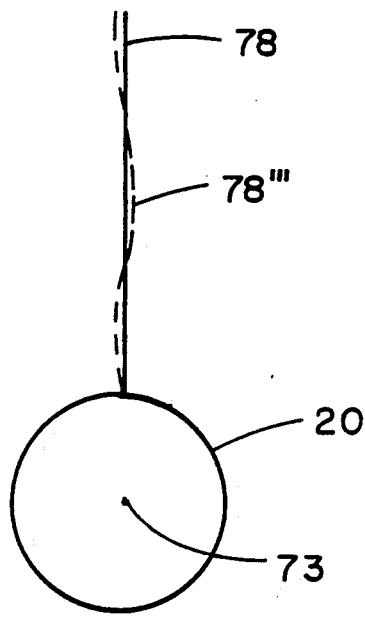
FIGS. 5 and 6 show one turbine blade of a blade row vibrating at first and fourth resonant frequencies shifted in phase respectively.

FIG. 5 shows blade 78 without vibration and blade 78''' with order-related vibration phase shifted (at a different rpm or sensor) as compared with blade 78' in FIG. 3.

Figure 6:
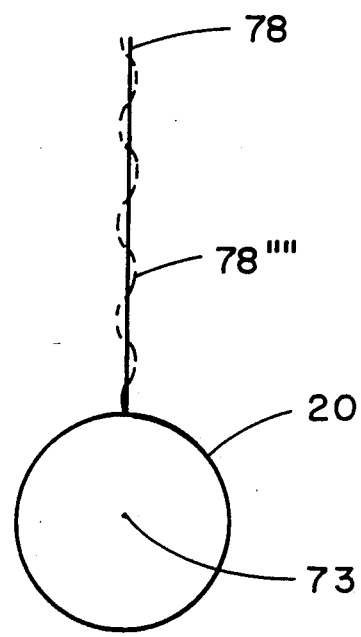

FIG. 6 shows blade 78 without vibration and blade 78'''' with order-related vibration phase shifted (at a different rpm or sensor) as compared with blade 78".

FIG. 7 shows one embodiment of the invention which may operate by using only one acoustic sensor 76. Acoustic sensor 76 is placed in location A on housing 29 to receive acoustic signals 88 as shown in FIG. 7. Acoustic sensor 76 functions to receive acoustic energy in a frequency range from 0-25 kilohertz providing a corresponding acoustic signal. The acoustic signal is coupled over lead 89 to an input of analog to digital converter 90 which converts the acoustic signal with an accuracy of 14 bits after suitable low pass filtering to a frequency at no more than half the sample rate to prevent aliasing. The output of analog to digital converter 90 is coupled over lead 91 to an input of memory 92. Memory 92 functions to store a record consisting of a plurality of samples obtained during each revolution of shaft 20 as a function of the shaft angular velocity (rpm) given at the beginning of a record wherein a record consists of, for example, 64 samples per revolution as a function of time.

Tachometer sensor 70 shown in FIGS. 1 and 7 is coupled over lines 71 and 72 to an input of shaft speed detector 94 which provides an output over line 95 to an input of address generator 96. Tachometer sensor 70 functions to provide a reference signal over leads 71 and 72 indicative of shaft 20 position and of rotor 30 position at least once each time shaft 20 completes a revolution about the shaft axis 73 to provide an indication of angular velocity (rpm) of shaft 20. Shaft speed detector 94 measures the time shaft 20 makes one complete revolution to determine the angular velocity in revolutions per minute (rpm) for the next revolution. In a typical operating turbine operating at 3600 rpm the rpm may vary plus or minus one rpm. The angular velocity of shaft 20 may be subdivided into sixteen increments between plus and minus one rpm to provide each increment of 0.125 rpm. An accurate measure of the current angular velocity of shaft 20 in rpm is essential so that data recorded per revolution which may comprise for example 64 to 128 samples is recorded as a function of the rpm in memory 92. Address generator 96 functions to generate an address as a function of the rpm of shaft 20 which is coupled over lead 97 to memory 92 to store in memory 92 a record of a plurality of samples for one revolution of shaft 20 before a new address generated as a function of the angular velocity of shaft 20 is provided for the next record which may or not be the same angular velocity as the prior revolution of shaft 20.

Address generator 96 also provides addresses over lead 97 for retrieving a record from memory 92 and coupling the record over lead 98 to an input of synchronous averaging circuit 100. Synchronous averaging circuit 100 also receives data from memory 102 over lead 104. Memory 102 may contain for example a running sum of the samples of records obtained at respective rotor positions of the rotor along with the number of times the running sum has had samples added thereto. Synchronous averaging circuit 100 may retrieve data from memory 102 on lead 104 and add the next record samples respectively received over line 98 as well as provide a count for the number of records added together which may be returned to memory 102 for storage over lead 105. A running average can be provided by also storing the average which may be obtained by dividing the running sum by the number of records added together at a respective rpm of shaft 20 and provide the average on lead 106 to an input of sample alignment 120. Synchronous averaging circuit 100 and memory 102 function to provide for averaging the amplitude and taking into account the polarity of the samples obtained at respective rotor positions within each revolution of shaft 20 revolving at a first angular velocity and a similar but separate averaging of the amplitude of the samples with shaft 20 revolving at a second angular velocity. Actually about 16 angular velocities in increments of 0.125 rpm are recorded or accumulatively summed in memory 102.

Sample alignment 120 functions to curve fit the averaged samples at a particular rpm and resample the curve to provide averaged samples corresponding to common shaft positions at two shaft rpm's. Sample alignment 120 receives address signals generated as a function of the rpm shaft 20 at the time the record was captured over lead 99. The output of sample alignment 120 is coupled over lead 121 to an input of multiplexer 107.

Address generator 96 provides -addresses over lead 99 to memory 102 and address register 103. The addresses on lead 99 may correspond to respective rpm of shaft 20 and may be used for providing data to synchronous averaging circuit 100 for averaging synchronously a number of samples at respective rpm's or to provide two consecutive addresses representative of two angular velocities of shaft 20 to memory 102 for providing averaged data over lead 106 to sample alignment 120 which in turn provides the data by way of multiplexer 107 to subtractor 108. Data representative of a first angular velocity is coupled over lead 109 to an input of subtractor 108. Data representative of a second angular velocity is coupled over lead 110 to a second input of subtractor 108. Subtractor 108 functions to subtract the amplitudes and taking into the account the polarity of averaged samples obtained at respective rotor or shaft positions of shaft 20 revolving at the first and at the second angular velocity to provide a difference Doppler signal at respective rotor or shaft positions of the rotor whereby order- related background noise due to other blades having nonuniformity in angular position on the rotor is removed. The difference Doppler signal is provided at the output of subtractor 108 on lead 112 to an output terminal and to the input of comparator 114. A voltage potential representative of a voltage threshold ($V_{TH}$) is coupled over lead 115 to a second input of comparator 114. Comparator 114 functions to compare the voltage $V_{TH}$ with the potential on lead 112 containing the difference Doppler sample to provide an output over lead 116 at times the difference Doppler signal exceeds the threshold voltage indicating the presence of a resonantly vibrating blade or blade group within blade row 25 in high pressure turbine 16.

In operation of difference Doppler circuit 86 as shown in FIG. 7, shaft 20 may have an angular velocity of 3600 rpm or 60 revolutions per second with analog to digital converter 90 taking a record of 64 samples per revolution at 14 bits per sample which would result in a sampling rate of 3840 hertz. If data was accumulated for as long as 30 minutes, then 108,000 records would be obtained. If the 108,000 records were distributed over 16 angular velocity bins of 0.125 rpm each from 3599 to 3601 rpm then on the average 6750 records would be in each angular velocity bin. Address generator 96 would select two angular velocities based on the largest number or records and the largest separation of angular velocities prior to sending the averaged records at these two angular velocities of shaft 20 to subtractor 108 to form the difference Doppler signal. Since over a 6750 records will have been averaged, non order-related background noise and blade flutter (non order-related blade vibration) will be reduced by averaging wherein the order-related background noise and blade vibration will accumulate and be enhanced. When the two averaged order-related records are subtracted from one another, taken at different angular velocities of shaft 20, order-related signals due to blade row nonuniformity will be cancelled out whereas order-related resonantly vibrating blades will remain due to a difference in resonant blade phase at common rotor positions. The phase difference in blade vibration is a function of the difference in rpm of shaft 20.

The signals or records retrieved from memory 102 on line 106 are synchronous averaged records which may be for example averaged over 2000 to 10,000 records within a respective angular velocity bin of shaft 20 in memory 102.

Address register 103 may hold the address used to access memory 102 and sample alignment 120. The address may be an indication of the rpm of shaft 20 corresponding to the record retrieved from memory 102 on lead 106 or on lead 121. The output of address register 103 may provide not only the rpm of the two records subtracted but also of the sample number in the record indicative of the location on the blade row or the blade at times comparator 114 provides an output on line 116. The output of address register 103 as shown in FIG. 7 is on lead 118.

If the sampling rate is independent of the rpm of shaft 20, then prior to subtracting the records obtained at two rpm's or angular velocities of shaft 20, one of the records will need to be shifted in order that the samples subtracted will correspond to the same physical location of the moving blade row 25 passed sensor 76. The records may be lined up by curve fitting the 64 samples to a 25 order curve fit formula followed by resampling the curve corresponding to obtaining two averaged samples at respective angular position of shaft 20. Sample alignment 120 performs this function and provides an output over lead 121 to multiplexer 107.

FIG. 8 shows a first alternate embodiment of the invention wherein the location of the resonantly vibrating blade may be located and the frequency of its vibration determine from the difference Doppler signal on lead 112 from difference Doppler circuit 86 shown in FIGS. 7 and 8. Referring to FIG. 8, lead 118 is coupled to a first input of Hilbert Transform 124 which contains the address indicative of rpm and data position with respect to shaft 20 of the data transferred over on lead 112 which is coupled to a second input of Hilbert Transform 124. By using the Hilbert Transform, the normal real valued time domain functions are made complex, which yield two useful properties, the envelope and the instantaneous frequency. The maximum amplitude determines the location of the vibrating blade since the amplitude of the vibrating blade will be maximum as it passes sensor 76. The instantaneous frequency at the time the vibrating blade passes 76 will be the resonant frequency of the vibrating blade since it will be moving laterally with respect to acoustic sensor 76. The Hilbert Transform is manifested by the fact that all the normal real-valued time domain function (correlation impulse response etc.) are in fact complex-valued functions because the imaginary part of a function is the Hilbert Transform of the real part. The time domain functions can be displayed similarly to the frequency domain functions in terms of their real part, imaginary part, magnitude, and phase versus time. The magnitude describes the envelope of a signal. The phase representation allows the detection of instantaneous frequency, which is of importance for signals sweeping in frequency with time i.e. a Doppler signal. While the Fourier Transform moves the independent variable of a signal from the time to the frequency domain or vice versa, the Hilbert Transform leaves the signal in the same domain. The Hilbert Transform of a time signal is another time signal and the Hilbert Transform of a frequency "signal" is another frequency signal. A non-mathematical way of describing the Hilbert Transform of a time signal is to say that it gives all the frequency components of a signal a minus 90 degree phase shift or in the time domain that it shifts each component by $\frac{1}{4}$ wavelength. This effect is similar to the integration of the signal. As an example, the Hilbert Transform of a sinusoid, for example, $\cos 2\pi ft$ is $\sin 2\pi ft$. The Hilbert Transform of $\sin 2\pi ft$ is $-\cos 2\pi ft$. With but depends on the wavelength of frequency of the particular component. The Hilbert Transform of a real-valued time signal, a(t), is defined as:

$$H[a(t)] = a(t) = \frac{1}{\pi} \int_{-\infty}^{\infty} a(\tau) \frac{1}{t - \tau} d\tau \qquad (1)$$

The Hilbert Transform is further described in a paper entitled "The Hilbert Transform" by N. Thrane, Technical Review, No. 3, 1984 published by A. Bruel & Kjaer publications, ISSN 007-2621.

The steps in signal processing performed by Hilbert Transform 124 will now be described to provide the amplitude peak over lead 125 with the blade position or blade number provided over lead 127. Further processing will yield the instantaneous frequency at the blade position of an amplitude peak to provide the frequency of the resonating blade over lead 128.

The first step taken in Hilbert Transform 124 is to record the amplitude and taking into account the polarity of the difference Doppler signal on lead 112 as a function of time or angular position of rotating shaft 20 on lead 118.

The second step is to transform the time domain signal to the frequency domain as a function of the order of running speed or angular velocity of rotating shaft 20.

The third step is to obtain the Hilbert Transform by shifting back 90 degrees in phase every frequency component of the frequency domain curve formed in step 2 with the base line being the same as in step 2 i.e. a function of the order of running speed.

The fourth step is to take the inverse Fourier transform of the data or of the curve formed in step 3 to provide data or a curve in the time domain as a function of one revolution of shaft 20 which is the same base line as used in step 1.

The fifth step is to take the Hilbert magnitude of the Hilbert Transform in step 4 using the same base line as in step 4 i.e. a function of one revolution of shaft 20. The amplitude peak in the data or curve formed in step 5 is an indication of the position of a resonantly vibrating blade.

In step 5, the Hilbert magnitude is determined by taking the square root of the sum of the amplitudes squared at each base line point of the original signal in step 1 plus the sum of the amplitudes in step 4 squared corresponding to the same base line points.

In step 6 the function $\cos 2\pi ft$. between plus one and minus 1 is plotted versus the same base line as used in step 5 and using the data from step 1 divided by the data from step 5. In other words, in step 6, the data point (ordinate) of step 1 as a function of the base line position (abscissa) is divided by the data point (ordinate) corresponding to the same base line position obtained in step 5.

In step 7, the instantaneous phase $\cos^{-1}\phi(t)$ is determined or plotted by determining the inverse of the cosine function determined in step 6. The same base line or abscissa is used in step 7 as used in steps 1, 4, 5 and 6.

In step 8, the instantaneous phase is $\phi(t)$ from step 7 is differentiated with respect to time (dt) and plotted as a function of the base line as used in FIG. 7, i.e. one revolution of shaft 20. The position on the base line or abscissa of the peak amplitude obtained in step 5 corresponds to the position to find the instantaneous frequency in step 8 and is the frequency of the resonantly vibrating blade causing the amplitude peak in step 5, for example, a blade in blade row 25 of high pressure turbine 16 shown in FIGS. 1 and 2.

Figure 9:
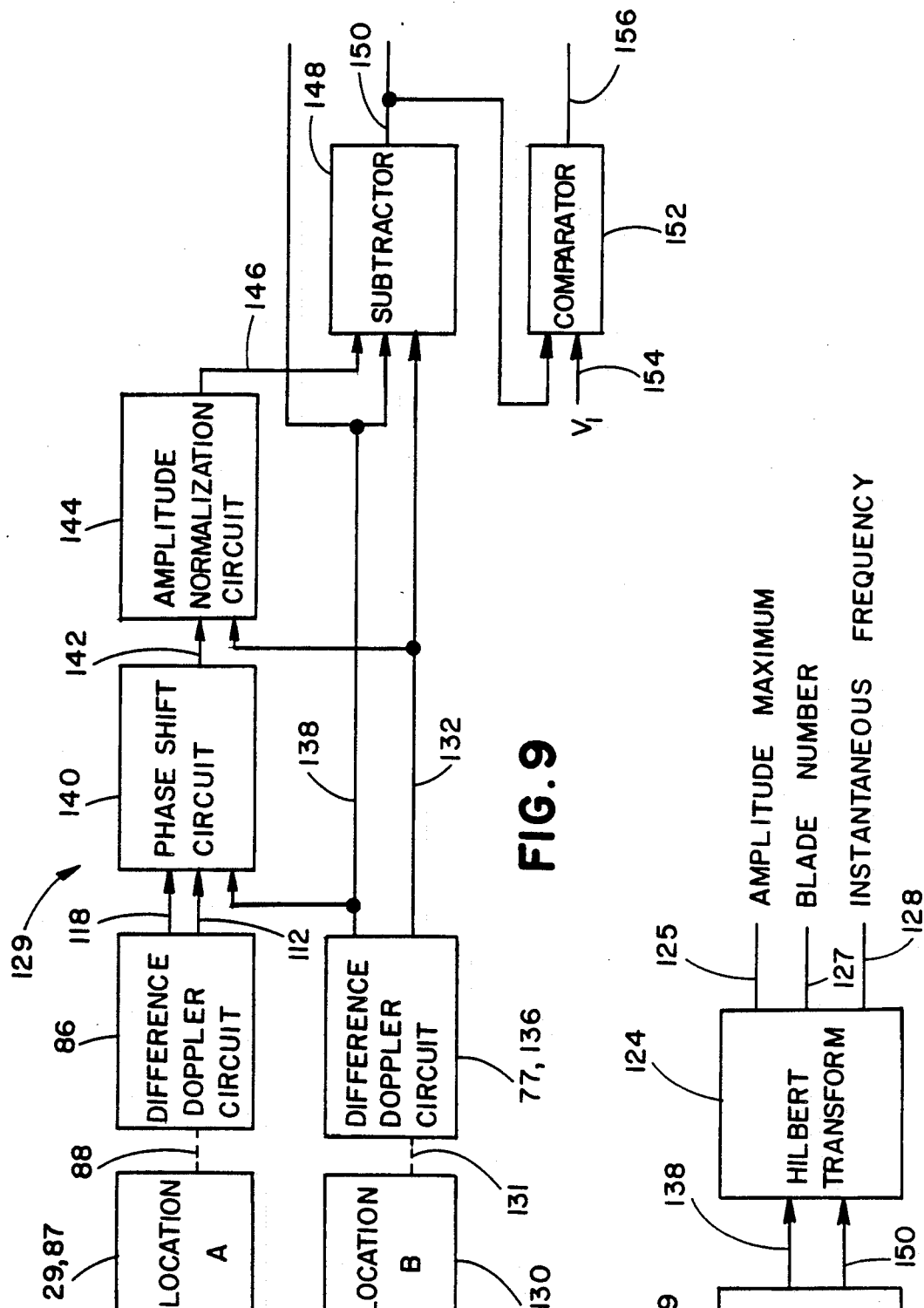
FIG. 9 is a second alternate embodiment of the invention.

Referring to FIG. 9, a second alternate embodiment of the invention is shown for detecting a resonantly vibrating blade attached to shaft 20 of a rotating rotor in an operating turbine row 25. As shown in FIGS. 1 and 2 a second acoustic sensor 77 is shown having a portion at location 130 inside housing 29. Acoustic sensor 77 receives acoustic signals 131 from location B at 130 as shown in FIG. 9. Difference Doppler circuit 86 corresponds to the embodiment shown in FIG. 7 and receives acoustic signals 88 from location A at 87. Difference Doppler circuit 136 corresponds to difference Doppler circuit 86 except it is coupled to acoustic sensor 77 in place of acoustic sensor 76. Acoustic sensor 76 is spaced apart from acoustic sensor 77 by a separation angle corresponding to an angle of rotation of shaft 20 to receive sound waves emanating from the vibrating blade of blade row 25 shown in FIG. 1 as the blade rotates about its rotor axis 73 to provide an acoustic signal from each acoustic sensor from the received sound waves.

Each acoustic sensor 76 and 77 are positioned with respect to rotor 30 and blade row 25, preferably downstream, so that the blade approaches and departs from each acoustic sensor in the course of one rotation of shaft 20 and of rotor 30 about the rotor axis 73 thereby imparting a Doppler effect to the received sound waves.

Phase shift circuit 140 as shown in FIG. 9 functions to provide sample alignment so that the samples correspond to the same position along the rotor for removing order-related background noise due to blade row nonuniformity etc. Phase shift circuit 140 receives over lead 138 the difference Doppler signal from difference Doppler circuit 136 as well as an address over lead 138 and a difference Doppler signal over lead 112 from difference Doppler circuit 86 as well as an address over lead 118. Phase shift circuit 140, which may be for example a computer, functions to phase shift or transform the difference Doppler samples at one or at each sensor in time to correspond to the same location on rotor 30 or blade row 25 at the time the samples were taken to provide transformed difference Doppler samples with respect to each sensor 76 and 77. As described with respect to sample alignment 120 the record consisting of samples of 1 revolution of the difference Doppler signal may be curve fitted with a formula or curve fitting equation to the 25th order and resampled to provide the appropriate phase shift to match the blade row locations respectively where the other difference Doppler signal samples were captured; or both signals on lines 112 and 138 may be curved fitted and resampled. The output of phase shift circuit 140 is coupled over lead 142 to an input of amplitude normalization circuit 144. Amplitude normalization circuit 144 functions to adjust the amplitude of one difference Doppler signal for example the signal on lead 118 so that is compensates for variation in sensor and circuit gain with the difference Doppler signal on lead 132. Difference Doppler signal on lead 132 is also coupled to amplitude normalization circuit 144 as a reference signal.

The output of amplitude normalization circuit 144 which is the same signal as on lead 142 but adjusted in amplitude is coupled over lead 146 to an input of subtractor 148. Subtractor 148 which may for example a circuit or a computer functions to subtract the difference Doppler signal on lead 146 from the difference Doppler signal on lead 132 to provide a difference-difference Doppler signal on lead 150. A signal indicative of the address or blade position is provided on lead 138 with respect to the output of subtractor 148 on lead 150. The output of subtractor 148 is coupled over lead 150 to an input of comparator 152. Comparator 152 has a second input over lead 154 which is coupled to a voltage $V_1$ for thresholding the signal on lead 150 to provide an output on lead 156 at times the signal on lead 150 exceeds the potential of lead 154. An output from comparator 152 on lead 156 is an indication that there is a resonantly vibrating blade which may be, for example, in blade row 25 of high pressure turbine 16. The location of the vibrating blade may be provided by the address signal or blade position signal on lead 138.

Figure 10:
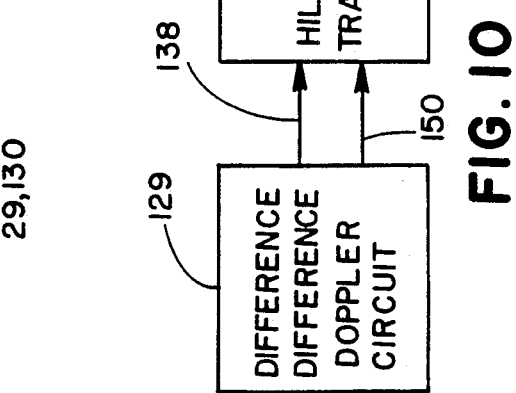
FIG. 10 is a third alternate embodiment of the invention.

Referring to FIG. 10, an improved method and apparatus is shown for locating the resonantly vibrating blade or blade group and for determining the frequency of the resonantly vibrating blade. Leads 138 and 150 of difference-difference Doppler circuit 129 are coupled to respective inputs of Hilbert Transform 124. Hilbert Transform 124 performs the same steps as previously described with respect to FIG. 8 to determine the amplitude maximum on lead 125, the blade number on lead 127 and the instantaneous frequency on lead 128. The instantaneous frequency at the amplitude peak corresponds to the frequency of the resonantly vibrating blade or blade group.

Figure 11:
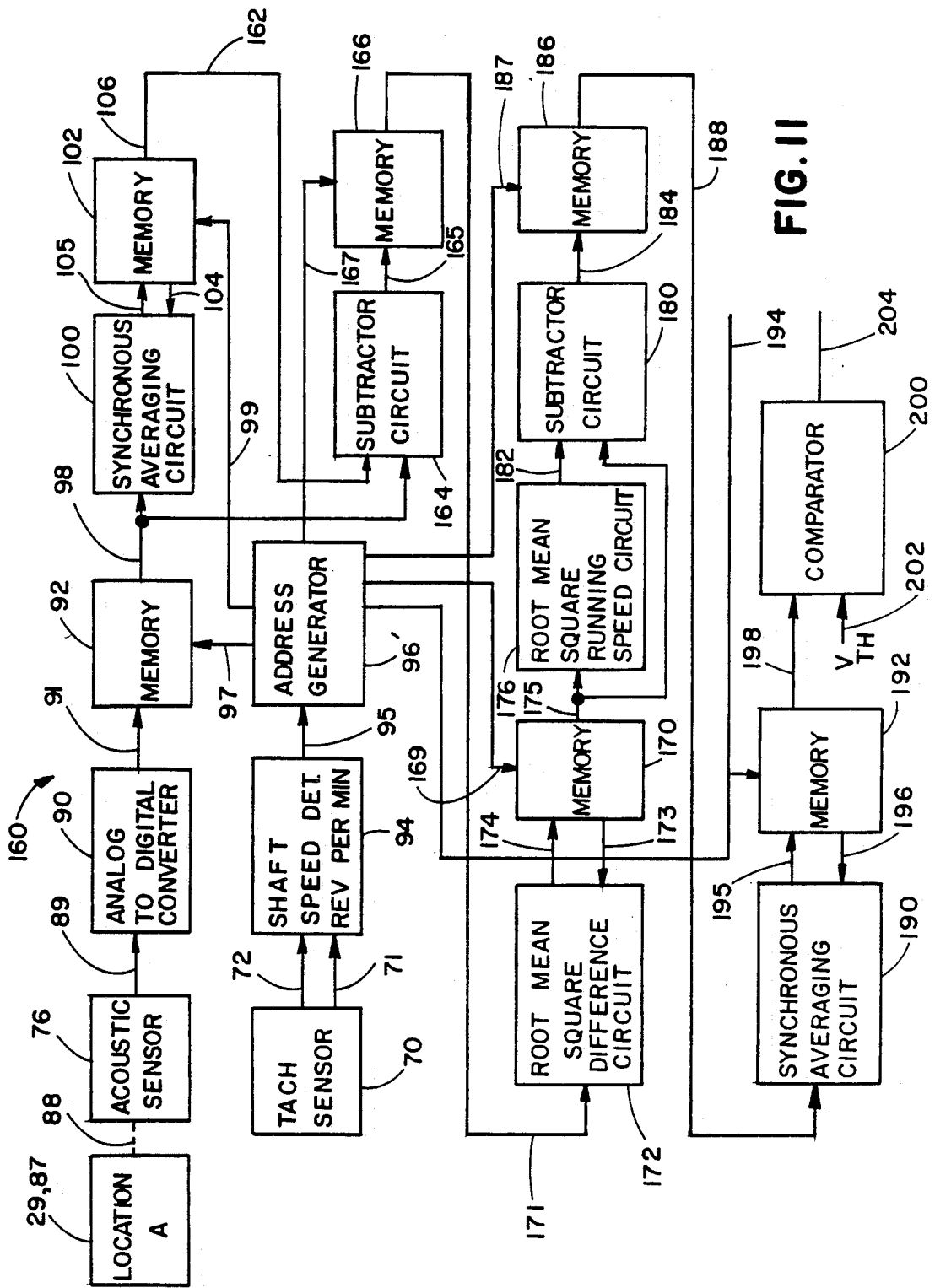
FIG. 11 is a fourth alternate embodiment of the invention.

Referring to FIG. 11 a fourth alternate embodiment of the invention is described for detecting and locating fluttering blades which are self excited nonresonantly vibrating blades vibrating at a natural frequency of the blade or a harmonic thereof. Blade vibrations can be classified in one of two general categories, order-related or non order-related. Order-related vibrations occur at exact integer multiples of running speed. For example, a blade with a natural frequency very close to 4 per revolution vibrates resonantly at exactly four (4) per revolution. On the other hand, a blade may vibrate or flutter in self excited fashion right at the natural frequency, but not exactly at four per revolution and thus not order-related. An order-related vibration, or an order-related signal repeats exactly in each revolution; while a non order-related vibration or signal does not. An order-related blade vibration results in an order-related Doppler signal in a downstream acoustic sensor. A nonperfect geometric blade row (blade to blade) results in an order-related non Doppler signal in a downstream microphone. A non order-related blade vibration results in a non order-related signal in a downstream microphone or sensor, but with an order-related amplitude envelope that peaks up as the vibrating blade passes by the sensor. Non order-related background steam noise in a high pressure steam turbine results in a non order-related signal in the downstream acoustic sensor 75 shown in FIG. 11, but with "straight line" amplitude envelope.

The apparatus of FIG. 8 as shown, cannot be used for detecting a fluttering or non order-related vibrating blade, since synchronous averaging circuit 100 functions by synchronous averaging the acoustic signal to remove the non order-related content of the acoustic signal on line 98 shown in FIG. 8. This occurs even though the amplitude envelope of non order-related content of the signal on line 98 is order-related, the signal itself is not, and thus the non order-related signal would average away.

Signal processor 160 shown in FIG. 11 provides a means for detecting the order-related envelope associated with a blade vibrating in a non order-related manner such as in fluttering and to do so in the presence of non order-related "straight line" background noise, and in the presence of order-related noise either from blade row nonuniformity, and from other order-related sources including blade resonance. In FIG. 11, like references are used for functions corresponding to the apparatus of FIG. 7. The signal on line 98 represents the acoustic signal from acoustic sensor 76 positioned downstream on a stationary member with respect to shaft rotor 30 shown in FIG. 1 to receive soundwaves or acoustic signals 88 emanating from the vibrating blade or rotor 30 as the blade rotates about the rotor axis 73. The acoustic signal from acoustic sensor 76 is digitized and sampled by analog to digital converter 90 and by address generator 96' which stores the digitized signal on line 91 in memory 92. The sampling may be at a rate such as 64 or 128 samples per revolution. The sampling may be proportional to running speed putting the samples in the revolution domain. Alternately, the samples may be evenly spaced apart from a start mark originating from the tach sensor 70. Each record consisting of 64 or 128 samples represent one revolution starting at the tach trigger from tach sensor 70 which is tagged with a label indicating the exact angular velocity of shaft 20 and rotor 30 at the time of capture of the record. As described, with respect to FIG. 7 there may be 100 speeds spanning plus or minus 1 rpm for a rotor having an angular velocity of 3600 rpm. If 64 samples were taken per record, then 1024 individual point-speed bins would be stored in memory 102. Synchronous averaging circuit 100 and memory 102 function to provide a running synchronous average over a period of time for example a half hour or an hour before being dropped out. The output of memory 106 is coupled over lead 162 to an input of subtractor circuit 164. The output of memory 92 on lead 98 is coupled to a second input of subtractor circuit 164. For each new record obtained from memory 92 corresponding to one of the sixteen speeds or angular velocities as determined by address generator 96', the corresponding 64 points of the running synchronous average from memory 102 at the respective angular velocity is first algebraicly subtracted from the new record in subtractor circuit 164. The output of subtractor circuit 164 is coupled over lead 165 to an input of memory 166 which stores in memory 166 a different signal sample at 1024 points speed bins. Address generator 96' couples an appropriate address over lead 167 to memory 166 so that different signal samples on lead 165 are stored as a function of rotor position and angular velocity. Subtractor circuit 164 functions to subtract the amplitude of averaged samples obtained at respective rotor positions of rotor 30 revolving at each angular velocity of the plurality of angular velocities or 100 speeds from individual samples obtained at respective rotor positions of rotor 30 revolving at each angular velocity of the plurality of angular velocities to provide a difference signal sample at respective rotor positions of rotor 30 revolving at the plurality of angular velocities. Memory 166 contains non order-related background noise due to flow noise and non order-related vibrating blades.

Address generator 96' functions to generate addresses over leads 167 and lead 169 to provide addresses to memories 166 and 170 respectively which corresponding to the same rotor position and rotor angular velocity. The output of memory 166 is coupled over lead 171 to an input of root mean square difference circuit 172. Root mean square difference circuit 172 functions to take the square root of the sum of the squares of the difference signal sample from memory 166 and the difference signal samples obtained earlier at the same respective rotor position and at the same angular velocity which had been stored in memory 170. Memory 170 supplies a signal over lead 173 which may be for example a running sum of the squares of previous difference signal samples stored in memory 170 with respect to a rotor position and angular velocity. The output of root mean difference circuit 172 is coupled over lead 174 to memory 170. Memory 170 has 1024 root mean square difference samples stored therein corresponding to respective rotor positions and rotor angular velocity.

Address generator 96' provides addresses over line 169 to read out the root mean square difference samples at respective rotor positions and at one angular velocity which is coupled over lead 175 to an input of root mean square running speed circuit 176 and to an input of subtractor circuit 180. Root mean square running speed circuit 176 functions to determine the root mean square of the root means square difference samples at respective rotor positions of rotor 30 revolving at each angular velocity of the plurality of velocities to form a root mean square running speed signal with respect to each angular velocity. The output of root mean square running speed circuit 176 is coupled over lead 182 to a second input of subtractor circuit 180.

Subtractor circuit 180 functions to subtract the amplitude of the root mean square running speed signal on lead 182 at each respective angular velocity of rotor 30 from the amplitude of the root mean square difference samples on lead 175 at the same corresponding angular velocity of rotor 30 to form reduced mean square difference samples at respective rotor positions and angular velocities which are coupled over lead 184 to an input of memory 186 which stores the samples. Address generator 96' provides addresses over lead 187 to memory 186 to locate the samples received on lead 184. Memory 186 thus holds 1024 reduced root mean square difference samples corresponding to 64 rotor positions and 16 angular velocities. The output of memory 186 when provided addresses by address generator 96' over lead 187 is coupled over lead 188 to an input of synchronous averaging circuit 190. Synchronous averaging circuit 190 functions to average over several revolutions for example 128 revolutions of rotor 30 the reduced means square difference samples at respective rotor positions of the rotor revolving at respective angular velocities. Memory 192 functions to hold the averages of the reduced means square difference samples by summing the samples as a running sum and dividing by the number of records stored. Address generator 96' provides appropriate addresses over lead 194 to an address input of memory 192 and to an output indicative of rotor position. Synchronous averaging circuit provides data to memory 192 over lead 195 and receives data from memory 192 over lead 196.

A non zero result from synchronous averaging circuit 190 after many averages for example 128 averages indicates an order-related envelope of a non order-related signal i.e. a fluttering blade. Memory 192 may contain 1024 averaged and reduced root mean square difference samples corresponding to 64 rotor positions and 16 angular velocities. Address generator 96' provides addresses over lead 194 to memory 192 to provide over lead 198 each averaged and reduced root mean square difference sample to comparator 200. A second input to comparator 200 is a threshold voltage $V_{TH}$ over lead 202. Comparator 200 functions to compare the averaged and reduced root mean square difference samples corresponding to respective rotor positions of said rotor revolving at respective angular velocities with the threshold value $V_{TH}$ whereby amplitudes above the threshold value $V_{TH}$ are indicative of a non order-related vibrating blade. The position of the vibrating blade is indicated by the address on lead 194 at the time the comparator 200 provides an output on lead 204.

Figure 12:
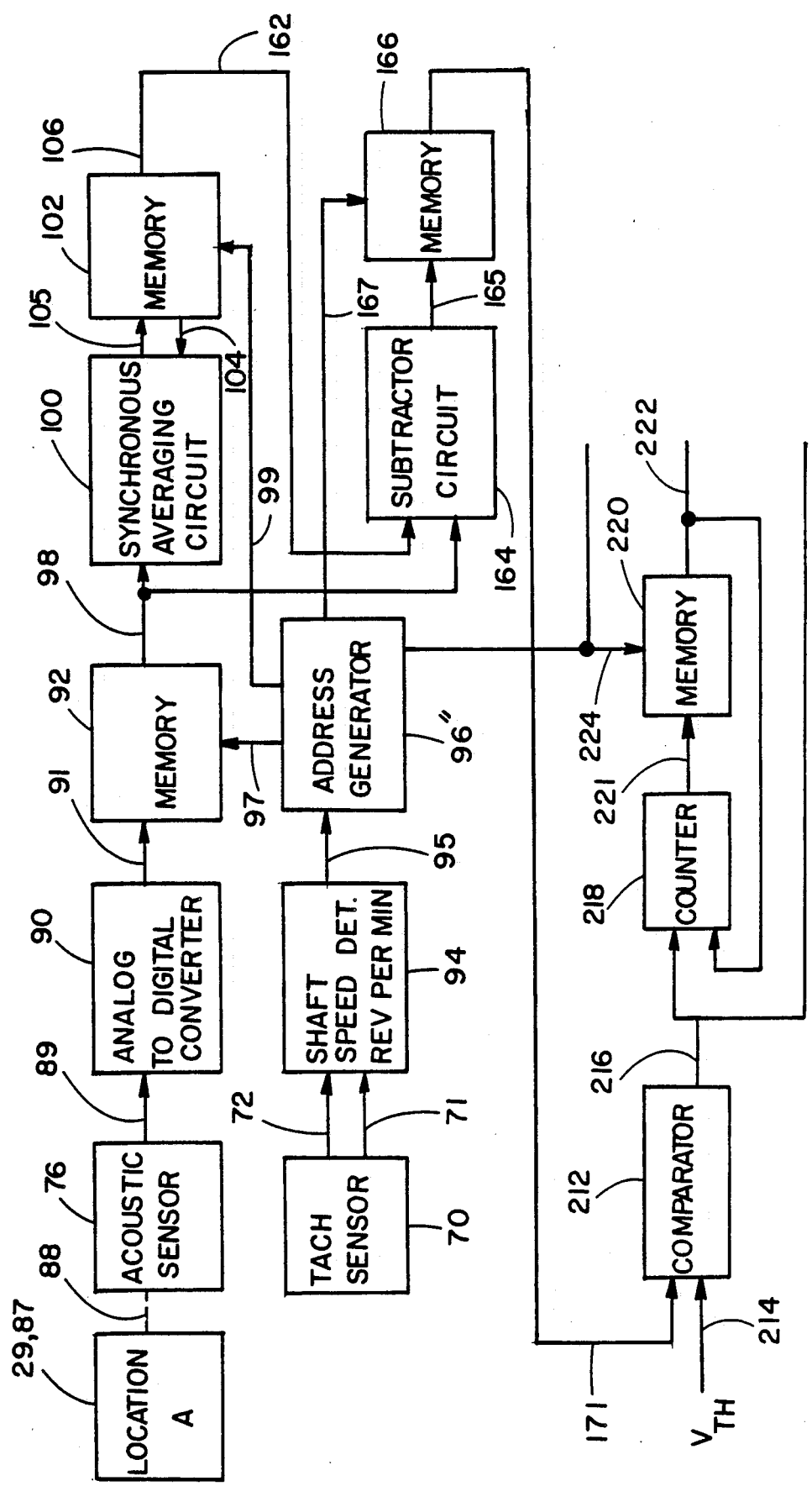
FIG. 12 is a fifth alternate embodiment of the invention.

Referring to FIG. 12 a signal processor 210 is shown for detecting an aerodynamic event in an operating turbine for example low pressure turbine 18 shown in FIG. 1. In FIG. 12, like references are used for functions corresponding to the apparatus of FIG. 11. An aerodynamic event in an operating turbine is typically non order-related, that is, independent of rotor position. One example of an aerodynamic event is condensation shock in an operating steam turbine where pressure and temperature conditions with respect to or in between turbine blade rows permit the steam to condense. The condensation is a very localized event in a particular blade row or in between blade rows and may move upstream or downstream. In FIG. 12 the difference signal sample at respective rotor positions of the rotor revolving at a plurality of angular frequencies on lead 71 is coupled to an input of comparator 212. A threshold voltage $V_{TH}$ is coupled over lead 214 to a second input of comparator 212. Comparator 212 functions to provide an output over lead 216 at times the difference signal sample exceeds the threshold voltage $V_{TH}$. Lead 216 is coupled to an external terminal indicative of an aerodynamic event and is coupled to an input of counter 218 which in cooperation with memory 220 counts the number of consecutive cycles or revolutions of rotor 30 where difference signal sample on lead 171 excess the voltage threshold on lead 214. The output of counter 218 is coupled over lead 221 to an input of memory 220. The output of memory 220 is coupled over lead 222 to an input of counter 218. Address generator 96" provides appropriate addresses over lead 224 indicative of rotor position and angular velocity of rotor 30. An output on lead 216 is indicative of an aerodynamic event due to a non order-related signal received by acoustic sensor 76 which may be due for example from condensation shock or rotating stall. Rotating stall is a phenomenon in a turbine where for some reason the flow of steam or gas is aerodynamically stalled on one or several blades in a blade row which in turn causes the gas to stall on other turbine blades adjacent to the previous stalled turbine blades. In a rotating stall several turbine blades are stalled in a blade row and the affected blades move around the blade row as described by the term rotating stall. An output on lead 222 provides the number of consecutive cycles that an aerodynamic event has occurred. Where several cycles are indicated on lead 22 an aerodynamic event is confirmed with high confidence. The output on lead 224 provides an indication of the rotor position and angular velocity of rotor 30 at time of the aerodynamic event. By comparing the rotor position on a revolution by revolution basis, a condensation shock which doesn't move with respect to rotor position may be distinguished with a rotating stall which does move with respect to rotor position.

In FIG. 12, synchronous averaging circuit 100, memory 102 and subtractor circuit 164 and memory 166 function to remove the order-related components from the samples on line 98. The aerodynamic event is by far the largest pressure amplitude source which is non order-related. Typically, several consecutive revolutions of rotor 30 with the amplitude on lead 171 exceeding a predetermined threshold would be required to signal the existence of an aerodynamic event on lead 222. Alternately, an aerodynamic event may be indicated or the beginning of an aerodynamic event may be indicated by an output on lead 216 which indicates each time or each revolution in each rotor position where the signal on lead 171 exceeds the voltage threshold.

Figure 13:
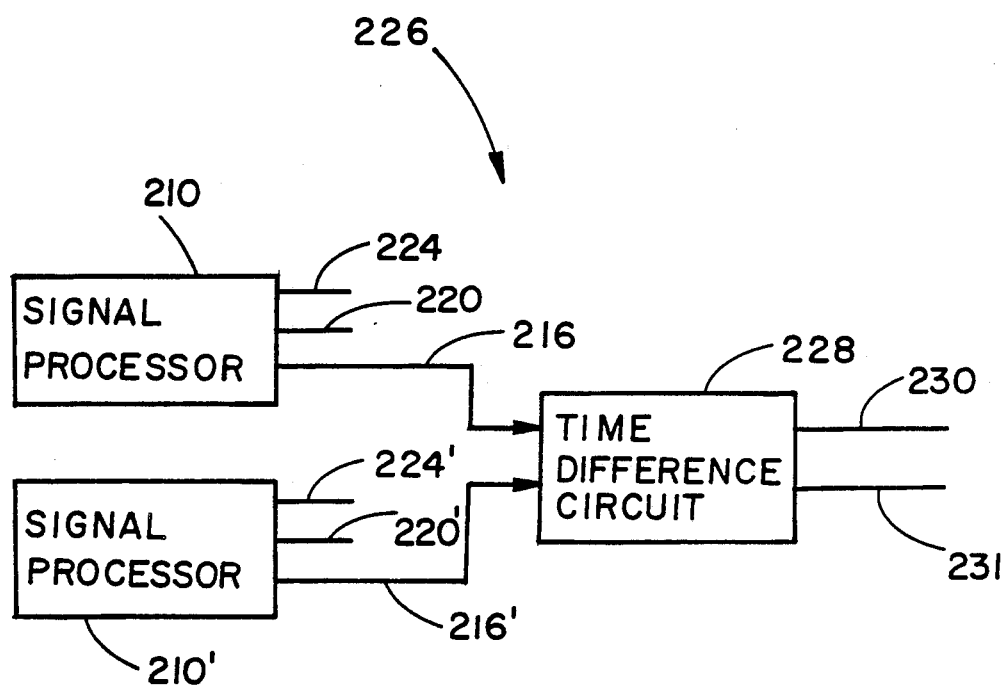
FIG. 13 is a sixth alternate embodiment of the invention.

Referring to FIG. 13, signal processor 226 is shown for detecting an aerodynamic event in an operating turbine and for determining the aerodynamic event is a condensation shock or a rotating stall. In FIG. 13, like references are used for functions corresponding to the apparatus of FIG. 12. Signal processor 210 which is shown in more detail in FIG. 12, has lead 216 coupled to an input of time difference circuit 228. Signal processor 210' which is the same as signal processor 210 except for the location acoustic sensor 76 which may be substituted with acoustic sensor 77 positioned at location B or location 130 shown in FIGS. 2 and 9. With two acoustic sensors 76 and 77 at locations 87 and 130 respectively, shown in FIG. 2, they are positioned at the same longitudinal or axial position on rotor 30 but separated by an angle of rotation of rotor 30. No time delay between outputs on leads 216 and 216' shown in FIG. 13 may indicate condensation shock on lead 230. Lead 216' is coupled from signal processor 210' to a second input of time difference circuit 228. Time difference circuit 228 functions to determine on a revolution by revolution basis the time difference between signals on leads 216 and 216'. If there is no time difference between signals on leads 216 and 216', then time difference circuit 228 provides an output on lead 230 indicative of condensation shock. If time difference circuit 228 records a fixed time delay between signals on leads 216 and 216' on a revolution by revolution basis, then an output is provided on lead 231 indicative of rotating stall. It is understood that the signals on leads 216 and 216' are non order-related signals. Time difference circuit 228 may also be coupled to leads 224, 220 20 of signal processor 210 and leads 224' and 220' of signal processor 210' to perform additional computations to confirm that condensation shock or a rotating stall has occurred. The major difference between the two aerodynamic events being the time lag of the non order-related signal detected at sensors 76 and 77 at locations 87 and 130 respectively.

Figure 14:
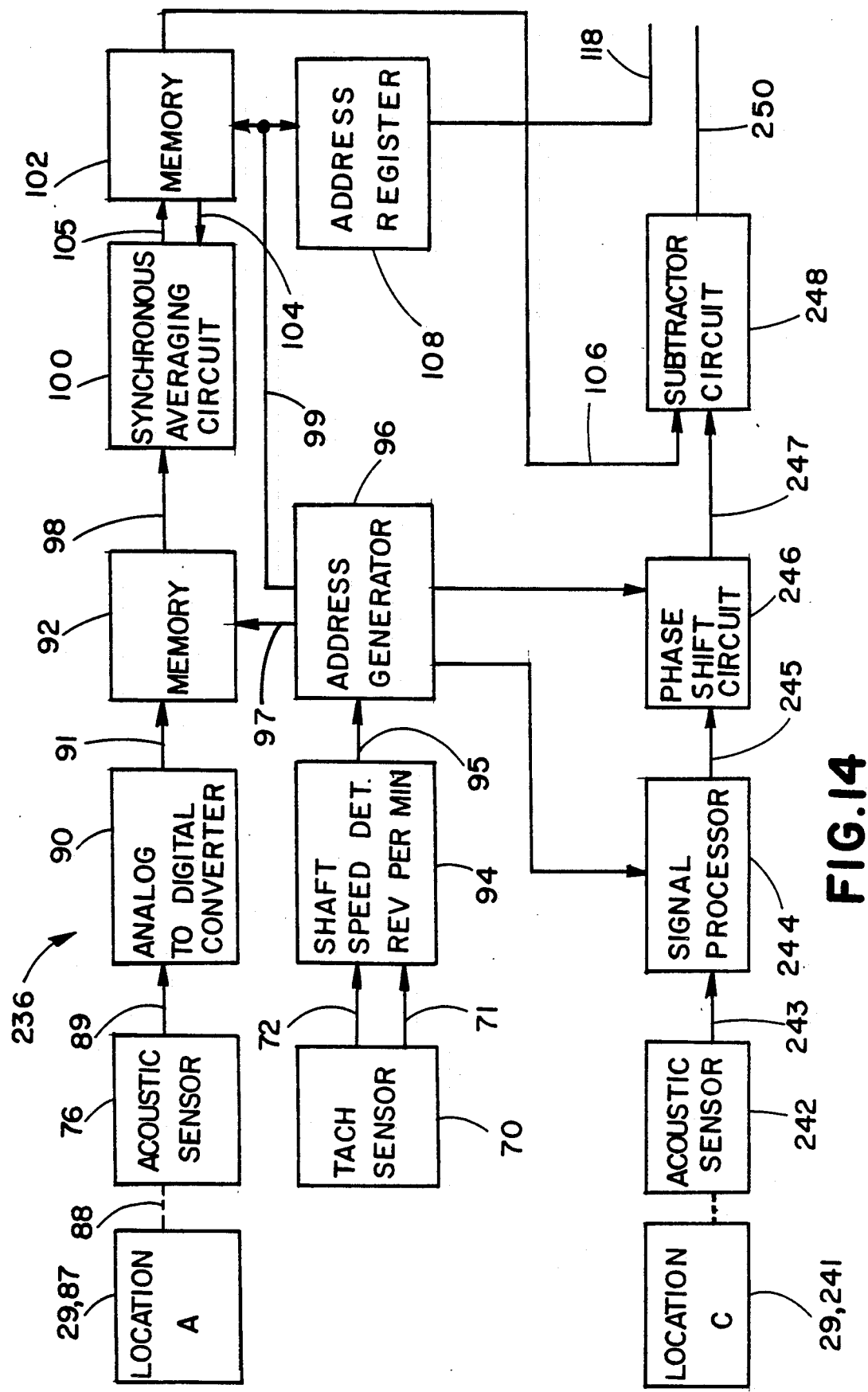
FIG. 14 is a seventh alternate embodiment of the invention.

Referring to FIG. 14, a monitor 236 is shown for detecting differential nozzle wear for example nozzle sections 237 and 238 shown in FIG. 1 of high pressure turbine 16. As shown in FIG. 1, four nozzle sections 237-240 may be positioned every 90 degrees upstream of blade row 25. Nozzle section 237 is on the top while nozzle section 239 is on the bottom and not shown. Downstream of blade row 25 and downstream of nozzles sections 237 and 239 may be positioned at location A and location C acoustic sensors 76 and 242 respectively. Location C corresponds to location 241 shown in FIG. 2 which is inside the housing 29 or turbine 16. Acoustic sensor 242 is also shown in FIG. 2. The output of acoustic sensor 242 is coupled over lead 243 to an input of signal processor 244. In FIG. 14, like references are used for functions corresponding the apparatus of FIG. 7. Signal processor 244 performs the same functions as analog to digital converter 90, memory 92, synchronous averaging circuit 100, and memory 102 interconnected as shown in FIG. 7. Signal processor 244 functions to obtain samples from acoustic sensor 76 and to synchronously average the samples as a function of angular velocity of rotor 30 shown in FIG. 1 which are stored in memory 102. The output of signal processor 244 is coupled over lead 245 to an input of phase shift circuit 246. Phase shift circuit 246 functions to shift the second samples of the second acoustic signal to correspond to the same place on rotor 30 as samples of the first acoustic signal. The output of phase shift circuit 246 is coupled over lead 247 to an input of subtractor circuit 248. It is noted that lead 243 corresponds to lead 89 and lead 245 corresponds to lead 106 in FIG. 7. Lead 106 is coupled to a second input of subtractor circuit 248. Samples are fed to subtractor circuit 248 in response to addresses generated by address generator 96 so that samples of the first and second acoustic signal are subtracted together corresponding to the same place on the rotor 30 of turbine 16. The signals on lead 106 and 247 are for the most part order-related signals inasmuch as non order-related signals have been minimized by synchronous averaging circuit 100. With respect to the first acoustic signal and the synchronous averaging circuit 100 will then signal process 244 with respect to the second acoustic signal. Thus, subtractor circuit 248 is subtracting two order-related signals corresponding to the same position on rotor 30 to provide a difference signal on lead 250. The magnitude or amplitude of the signal on lead 250 is an indication of nozzle wear for the nozzle section upstream of acoustic sensors 76 and 242 respectively.

In FIG. 14, said each acoustic sensor 76 and 242 sees an order-related signal from the same place on the blade row 25 of rotor 30, separated in phase or time, the only major difference in the two acoustic signals after being corrected for this phase or time difference, must be due to a difference in the level of gas or steam flow. A difference in the amount of nozzle wear between nozzle sections 237 and 239 upstream of sensors 76 and 242 respectively, results in a difference in steam flow which results in a difference in the amplitude of the order-related signal picked up via the acoustic signals 88 and 251 at acoustic sensors 76 and 242. Acoustic sensors 76 and 242 should be able to withstand a high pressure of greater than 3000 pounds per square inch which corresponds to 465 pounds per square centimeter. Sensors 76 and 242 should also withstand a high temperature of greater than 1000° F. which corresponds to 537.8° C.

Figure 15:
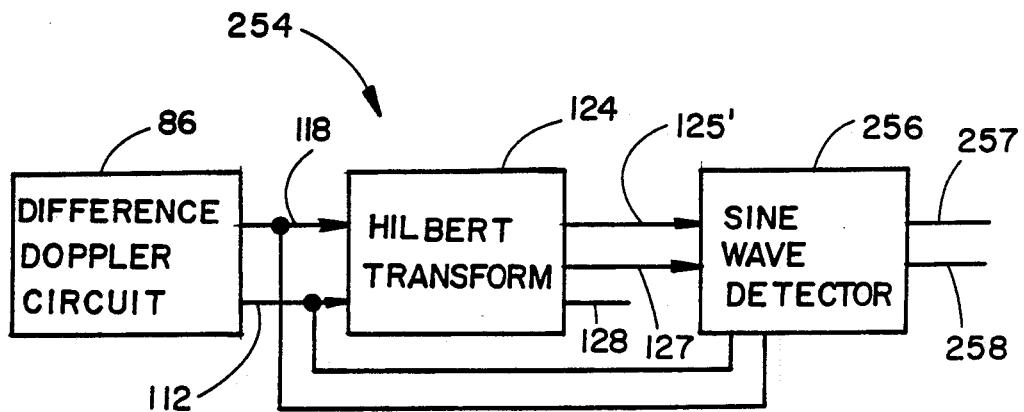
FIG. 15 is an eighth alternate embodiment of the invention.

Referring to FIG. 15, a monitor 254 is shown for measurement of order-related torsional resonant shaft vibrations in an operating turbine. In FIG. 15, like references are used for functions corresponding to the apparatus of FIGS. 7 and 8. In FIG. 15, lead 118 is coupled to an input of sine wave detector 256. Lead 112 is also coupled to an input of sine wave detector 256. Lead 125 from Hilbert Transform 124 is coupled to an input of sine wave detector 256. Lead 127 from an output of Hilbert Transform 124 is coupled to an input of sine wave detector 256. Monitor 254 recognizes the fact that torsional shaft vibration, for example shaft 20 shown in FIG. 1, projects out into large tangential blade vibration at the blade tips of large turbines. If tangential blade vibration is order-related, it repeats in each revolution. If the tangential blade vibration is resonant, the tangential blade vibration will vary its phase as a function of speed. If tangential blade vibration is highly resonant, i.e. a very close match between the effected order of running speed and the natural frequency of the tangential blade vibration, and if the sampling is low, then the resulting tangential blade tip vibrations can be uncovered using the embodiment shown in FIG. 15. Unlike the single resonant blade in a blade row where the Hilbert magnitude looks like one peak within the revolution of shaft 20, the Hilbert Magnitude looks like a sine wave with the number of cycles within a revolution of shaft 20 corresponding to the number of orders of the torsional vibration. In operation of monitor 254, the Hilbert amplitude including the amplitude maximum is coupled out on lead 125' to sine wave detector 256. Sine wave detector 256 functions to analyze the amplitude on lead 125' with respect to each revolution to detect an amplitude sin wave of one or more cycles per revolution. Lead 127 provides the blade number or location of amplitude peaks per revolution. Alternately, sine wave detector may look at the raw data supplied over lead 118 and 112 to determine whether the amplitude is varying according to a sine wave function per revolution. Sine wave detector 256 may provide an output on lead 257 indicative of torsional vibration of shaft 20. Sine wave detector 256 may provide an output on lead 258 indicative of the frequency of the torsional shaft vibration.

Figure 16:
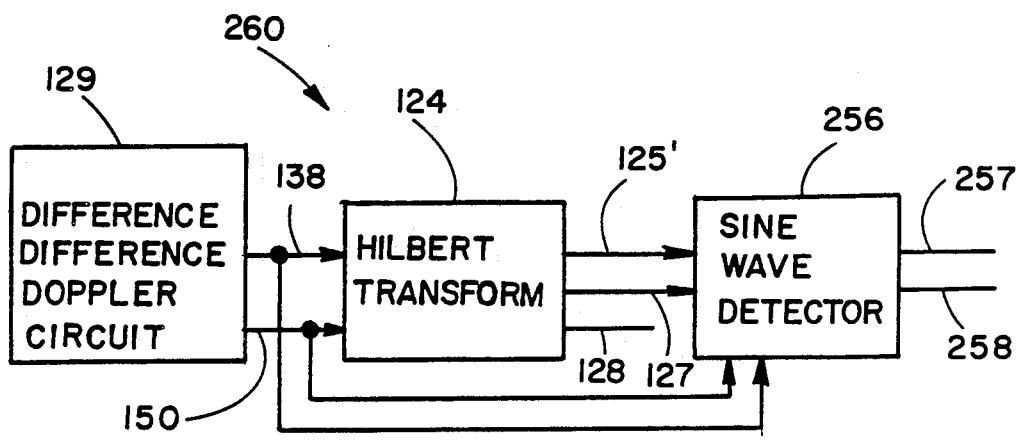
FIG. 16 is a ninth alternate embodiment of the invention.

Referring to FIG. 16, monitor 260 is shown for measuring the order-related torsional resonant shaft vibration in a turbine. In FIG. 16, like references are used for functions corresponding to the apparatus of FIG. 15. In FIG. 16, difference-difference Doppler circuit 129 is substituted for difference Doppler circuit 86. Sine wave detector 256 functions the same in FIG. 16 as it did in FIG. 15.

Figure 17:
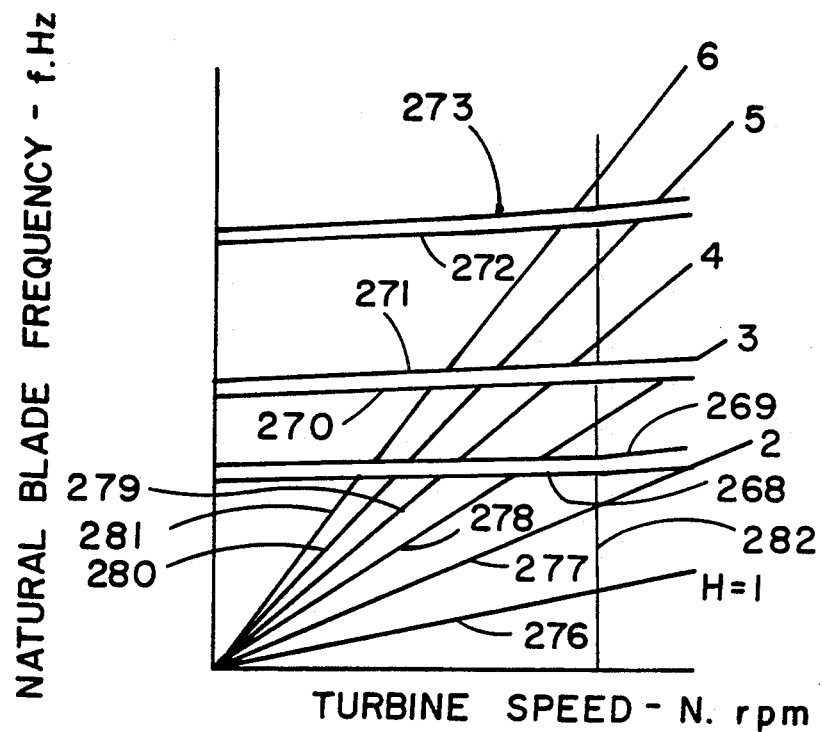
FIG. 17 is a graph of a Campbell diagram showing natural blade vibration, frequency and running speed frequencies.

Referring to FIG. 17, a typical Campbell diagram for a low pressure turbine blade is shown. In FIG. 17, the ordinate represents frequency in hertz and the abscissa represents turbine speed N in revolutions per minute (rpm). In FIG. 17, the space between curves 268 and 269 represent a narrow zone where the first natural frequency of a turbine blade occurs. The space between curves 270 and 271 represent a narrow band of frequencies where the low pressure blade vibrates at twice its natural frequency. The space between curves 272 and 273 represent the narrow band of frequencies where the low pressure turbine blade vibrates at three times its natural frequency. In FIG. 17, curves 276–281 plot the first through sixth harmonic respectively of turbine speed. Frequency and cycles per second equals the order of harmonic times N (turbine speed) (rpm)/60. As shown in FIG. 17, high amplitude resonant vibrations can occur where an forcing frequency i.e. running speed closely matches a natural vibration frequency of a turbine blade. However, for the turbine blade vibration to be really severe, the forcing frequency and natural frequency must be extremely close, the damping for the effective mode must be very low, and the forcing mechanism must be such as to be able to drive the mode effectively.

Where the forcing and natural frequencies do not exactly match, it is important to realize that the vibration takes place at the forcing frequency, not at the natural frequency of the blade. Forcing frequencies exist at all the integer multiples of running speed, but some of these are obviously more significant than others.

One prevalent forcing component for turbine blades is at nozzle passing frequency. This arises from the impulse a blade receives as it passes each nozzle wake. Since these impulses are not perfectly sinusoidal in form, harmonics of nozzle passing frequency also will be present.

In addition, any repetitious flow nonuniformities within the rotational cycle such as those arising from the horizontal split of the nozzle blocks and casing, from internal struts, inlet or exhaust openings, or any variation nozzle to nozzle, all cause forcing frequencies at once-per-rev and its harmonics. Even when nozzle spacings, strut spacings, or other spacings are not integer submultiples of a revolution, just as long as a pattern, no matter how unusual, repeats in every revolution, the excitation frequencies will be exact integer multiples of rotational speed.

The amplification factor associated with a resonant vibration depends upon both the degree of frequency math between the driving frequency and the natural frequency and on the damping associated with that mode. The damping is often given in terms of the amplification factor for a perfect match. Here factors of several hundred are not uncommon for blade modes. But a mode with an amplification factor of 400 for a perfect frequency match drops to an amplification of less than 50 for just a one percent mismatch. Therefore, a near perfect frequency match is required for severe high amplitude resonants of the turbine blade.

Thus, with typical manufacturing variations, only a few of the blades or blade groups in a given row might be vibrating excessively at any one time, even in a problem situation.

Finally, whether a particular mode can be efficiently driven depends on how the driving forces line up spacially and temporally with the mode shape. In short, are the forces on one part of the structure working with or against the forces on the other parts of the structure? In the case of the first bending mode of a blade corresponding to the first natural frequency of the blade, the whole blade moves in the same direction at the same time, and thus all the dynamic forces acting along the blade work together. However, for the second bending mode, or second natural frequency, the upper part of the blade moves one way while the lower part moves another. Thus, if the forces on the upper part of the blade are supporting the motion, the forces on the lower part are opposing it. Then, the result is that a reduced effective force acts to excite the mode. This description, though somewhat simplistic, explains why the higher order modes are less likely to be strongly excited. For blade group modes forces can work against each other at the different circumferential locations as well.

Turbine manufactures, in designing low pressure blades and blade groups, attempt to avoid the possibility of forced resonant vibration. As illustrated in FIG. 17 by the Campbell diagram, the goal of the turbine blade designer is to avoid intersecting the harmonic lines, curves 276-281, with the first few lateral and torsional frequencies, when at operating speed i.e. the natural frequencies between curves 268-269, 270-271, and 272-273. In practice, this requires a sufficient margin between the forcing and natural frequencies so that statistical variations in blade attachments, material non-uniformities and manufacturing tolerances can be accommodated. As shown in FIG. 17, the natural frequencies of blade vibration changed slightly with rotation speed of shaft 20 or of rotor 30 as shown in FIG. 1. The change in natural frequency of the vibrating blade is due to centrifugal loading effects, and must be determined by testing.

Despite careful design and testing, it is not practical to dynamically evaluate each blade under operating conditions. With the uncertainties in individual blade parameters and the fact that the higher modes are usually neglected, one or more turbine blades in a given low pressure turbine stage may be resonant at or close to one of the forcing frequencies. Such a blade may have a sufficiently high amplitude of vibration and steady stress level to cause fatigue cracking, especially if corrosion is also present.

The turbine speed may be for example 3600 rpm which is shown in FIG. 17 by line 282.

Figure 18:
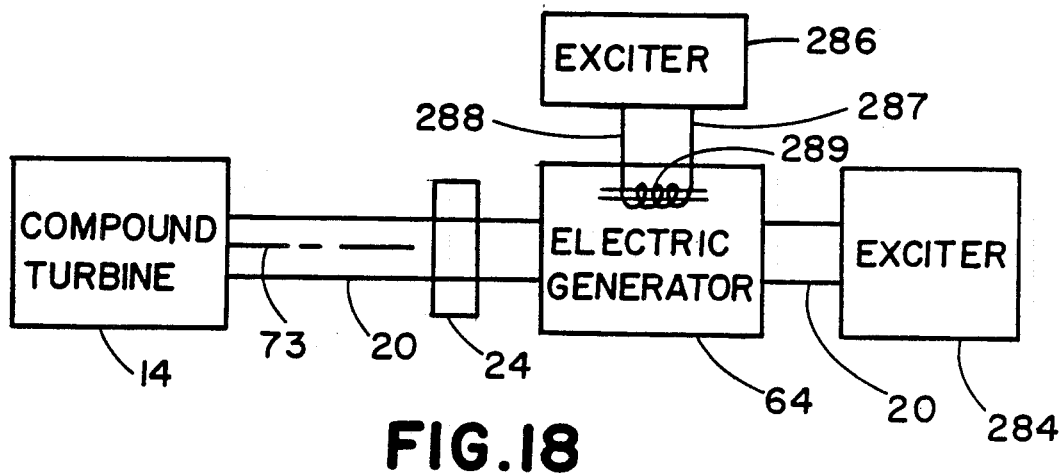
FIG. 18 is a tenth alternate embodiment of the invention.

FIG. 18 shows an exciter 284 for inducing torsional vibrations into shaft 20 of a running turbine 14 for the purpose of determining a Campbell diagram under normal operating conditions. Exciter 284 may be coupled directly to shaft 20 as shown in FIG. 18 which may be a motor to induce torsional vibrations on shaft 20. Alternately, exciter 286 may be coupled to the rotating magnetic field of electric generator 64 to provide amplitude modulation to the magnetic field at frequencies at or near tangential vibration modes i.e. natural frequencies of the turbine blades. The power required for excitation by exciter 286 is limited to the maximum voltage variation allowable for on line conditions of electric generator. The power required from exciter 286 is relatively low if the excitation input is at the direct current field windings of electric generator 64. The power required from exciter 286 is limited by the inductance of electric generator 64 and limited by the hysteresis losses inherent in generator 64. The induced torsional vibrations may be for example in the range from 140 to 150 hertz. Torsional oscillation or vibration of shaft 20 should be sufficient to deflect the turbine blade at its end by about 0.00254 centimeters (0.001 inches).

In FIG. 18, exciter 286 may be coupled to alternator or electric generator 64 over leads 287 and 288. Leads 288 and 287 may be coupled to the field windings of electric generator 264. The power supplied over leads 287 and 288 to provide adequate torsional vibration has been found to be a few percent of the power generated by the electric generator 64. Exciter 286 may have a frequency control circuit within it to vary the frequency from 0-200 hertz for example. It is noted that in FIG. 17 the first natural frequency between curves 268 and 269 normally occur in the vicinity of 150 hertz.

Individual axial vibration may be induced by a fixed coil mounted within a nozzle block blade or by a series of coils spaced around the block to provide excitation at the range of frequencies of interest.

In operation, the Campbell diagram may be determined by varying the torsional vibration over a range of predetermined frequencies and at the same time monitoring non order-related blade vibration using the signal processor shown in FIG. 11.

What is claimed is:

1. An apparatus for detecting a vibrating blade of a rotating rotor in an operating turbine comprising:

an acoustic sensor positioned on a stationary member with respect to said rotor to receive sound waves emanating from said vibrating blade of said rotor as said blade rotates about said rotor axis and to provide an acoustic signal from said received sound waves, said acoustic sensor positioned with respect to said rotor so that said blade approaches and departs from said acoustic sensor in the course of one rotation of said rotor about said rotor axis thereby imparting a Doppler effect to said received sound waves, first means for obtaining a reference signal indicative of rotor position at least once each time said rotor completes a revolution about said rotor axis and for determining the angular velocity of said rotor, second means for sampling said acoustic signal to obtain samples as a function of rotor position as said rotor completes a plurality of revolutions at a first and at a second angular velocity of said rotor, third means for averaging said samples obtained at respective rotor positions of said rotor revolving at said first angular velocity and revolving at said second angular velocity, fourth means for subtracting the averaged samples obtained at respective rotor positions of said rotor revolving at said first and at said second angular velocity to provide a difference signal at respective rotor positions of said rotor whereby order-related background noise due to other blades having nonuniformity in angular position on the rotor is removed, and fifth means for comparing the amplitude of said difference signal at respective rotor positions of said rotor with a threshold value whereby amplitudes above said threshold value are indicative of said vibrating blade.

2. The apparatus of claim 1, wherein said first means includes sixth means for obtaining a reference signal from the shaft of the rotor.

3. The apparatus of claim 1, wherein said second means for sampling includes sixth means for sampling at said first and second angular velocity where said first and second angular velocity are spaced apart by at least one revolution per minute.

4. The apparatus of claim 1, wherein said third means for averaging includes sixth means for averaging sampled over at least one thousand revolutions of said rotor.

5. The apparatus of claim 1, wherein said fifth means includes sixth means for determining the rotor position at the peak amplitude of said difference signal at times the difference signal exceeds the threshold value.

6. The apparatus of claim 5, wherein said sixth means includes seventh means for determining the frequency of said difference signal at said peak amplitude.

7. The apparatus of claim 6, wherein said seventh means includes eighth means for determining the instantaneous phase of said difference signal at said peak amplitude.

8. The apparatus of claim 7, wherein said seventh means include ninth means for differentiating the instantaneous phase of said difference signal.

9. The apparatus of claim 5, wherein said sixth means includes seventh means for obtaining the difference signal in the frequency domain and eighth means for obtaining the Hilbert Transform of the difference signal in the frequency domain.

10. A method for detecting a vibrating blade of a rotating rotor in an operating turbine having an acoustic sensor positioned on a stationary member with respect to said rotor to receive sound waves emanating from said vibrating blade of said rotor as said blade rotates about said rotor axis and to provide an acoustic signal from said received sound waves,
said acoustic sensor positioned with respect to said rotor so that said blade approaches and departs from said acoustic sensor in the course of one rotation of said rotor about said rotor axis thereby imparting a Doppler effect to said received sound waves comprising the steps of:
obtaining a reference signal indicative of rotor position at least once each time said rotor completes a revolution about said rotor axis and for determining the angular velocity of said rotor,
sampling said acoustic signal to obtain samples as a function of rotor position as said rotor completes a plurality of revolutions at a first and at a second angular velocity of said rotor,
averaging said samples obtained at respective rotor positions of said rotor revolving at said first angular velocity and revolving at said second angular velocity,
subtracting the averaged samples obtained at respective rotor positions of said rotor revolving at said first and at said second angular velocity to provide a difference signal at respective rotor positions of said rotor whereby order-related background noise due to other blades having nonuniformity in angular position on the rotor is removed, and
comparing the amplitude of said difference signal at respective rotor positions of said rotor with a threshold value whereby amplitudes above said threshold value are indicative of said vibrating blade.

11. The method of claim 10, wherein said step of obtaining includes the step of sensing a reference signal from the shaft of the rotor.

12. The method of claim 10, wherein said step of sampling includes the step of sampling at said first and second angular velocity where said first and second angular velocity are spaced apart by at least one revolution per minute.

13. The method of claim 10, wherein said step of averaging includes the step of averaging samples over at least one thousand revolutions of said rotor.

14. The method of claim 10, wherein said step of comparing includes the first step of determining the rotor position at the peak amplitude of said difference signal at times the difference signal exceeds the threshold value.

15. The method of claim 14, wherein said first step of determining includes the second step of determining the frequency of said difference signal at said peak amplitude.

16. The method of claim 15, wherein said second step of determining includes the third step of determining the instantaneous phase of said difference signal at said peak amplitude.

17. The method of claim 16, wherein said second step of determining includes the step of differentiating the instantaneous phase of said difference signal.

18. The method of claim 14, wherein said first step of determining includes the second step of determining the difference signal in the frequency domain and the third step of determining the Hilbert Transform of the difference signal in the frequency domain.

19. An apparatus for detecting a vibrating blade of a rotating rotor in an operating turbine comprising:
first and second acoustic sensors positioned apart by a predetermined angle of rotation of said rotor on a stationary member with respect to said rotor to receive sound waves emanating from said vibrating blade of said rotor as said blade rotates about said rotor axis and to provide first and second acoustic signals from said received sound waves,
said first and second acoustic sensors positioned with respect to said rotor so that said blade approaches and departs from said first and second acoustic sensors in the course of one rotation of said rotor about said rotor axis thereby imparting a Doppler effect to said received sound waves,
first means for obtaining a reference signal indicative of rotor position at least once each time said rotor completes a revolution about said rotor axis and for determining the angular velocity of said rotor,
second means for sampling said first and second acoustic signals from said first and second acoustic sensors respectively to obtain samples as a function of respective rotor positions as said rotor completes a plurality of revolutions at a first and at a second angular velocity of said rotor,
third means for averaging said samples of each of said first and second signals obtained at respective rotor positions of said rotor revolving at said first angular velocity and revolving at said second angular velocity,
fourth means for subtracting the averaged samples of said first signal obtained at respective rotor positions of said rotor revolving at said first and at said second angular velocity to provide a first difference signal at respective rotor positions of said rotor whereby order-related background noise due to other blades having nonuniformity in angular position on the rotor is removed, fifth means for subtracting the amplitudes of averaged samples of said second signal obtained at respective rotor positions of said rotor revolving at said first and at said second angular velocity to provide a second difference signal at respective rotor positions of said rotor whereby order related background noise due to other blades having nonuniformity in angular position on the rotor is reduced, sixth means for time shifting said first difference signal with respect to said second difference signal so that said first difference signal corresponds to the same respective position on the rotor as said second difference signal, seventh means for subtracting said first and second difference signals to provide a difference-difference signal whereby order related background noise is further reduced, and eighth means for comparing the amplitude of said difference-difference signal at respective rotor positions of said rotor with a threshold value whereby amplitudes above said threshold value are indicative of said vibrating blades.

20. The apparatus of claim 19, further including ninth means for attenuating said first difference signal so that the amplitudes of said first and second difference signals are optimized for reducing order-related background noise at times they are subtracted.

21. The apparatus of claim 19, wherein said first means includes ninth means for obtaining a reference signal from the shaft of the rotor.

22. The apparatus of claim 19, wherein said second means for sampling includes ninth means for sampling at said first and second angular velocity where said first and second angular velocity are spaced apart by at least one revolution per minute.

23. The apparatus of claim 19, wherein said third means for averaging includes ninth means for averaging samples over at least one thousand revolutions of said rotor.

24. The apparatus of claim 19, wherein said eighth means includes ninth means for determining the rotor position at the peak amplitude of said difference-difference signal at times the difference-difference signal exceeds the threshold value.

25. The apparatus of claim 24, wherein said ninth means includes tenth means for determining the frequency of said difference-difference signal at said peak amplitude.

26. The apparatus of claim 25, wherein said tenth means includes eleventh means for determining the instantaneous phase of said difference-difference signal at said peak amplitude.

27. The apparatus of claim 26, wherein said tenth means include twelfth means for differentiating the instantaneous phase of said difference-difference signal.

28. The apparatus of claim 24, wherein said ninth means includes tenth means for obtaining the difference-difference signal in the frequency domain and eleventh means for obtaining the Hilbert Transform of the difference-difference signal in the frequency domain.

29. A method for detecting a vibrating blade of a rotating rotor in an operating turbine having:

first and second acoustic sensors positioned apart by a predetermined angle of rotation of said rotor on a stationary member with respect to said rotor to receive sound waves emanating from said vibrating blade of said rotor as said blade rotates about said rotor axis and to provide first and second acoustic signals from said received sound waves, said first and second acoustic sensors positioned with respect to said rotor so that said blade approaches and departs from said first and second acoustic sensors in the course of one rotation of said rotor about said rotor axis thereby imparting a Doppler effect to said received sound waves comprising the steps of:

obtaining a reference signal indicative of rotor position at least once each time said rotor completes a revolution about said rotor axis and for determining the angular velocity of said rotor, sampling said first and second acoustic signals from said first and second acoustic sensors respectively to obtain samples as a function of respective rotor positions as said rotor completes a plurality of revolutions at a first and at a second angular velocity of said rotor, averaging said samples of each of said first and second signals obtained at respective rotor positions of said rotor revolving at said first angular velocity and revolving at said second angular velocity, subtracting the averaged samples of said first signal obtained at respective rotor positions of said rotor revolving at said first and at said second angular velocity to provide a first difference signal at respective rotor positions of said rotor whereby order-related background noise due to other blades having nonuniformity in angular position on the rotor is removed, subtracting the amplitudes of averaged samples of said second signal obtained at respective rotor positions of said rotor revolving at said first and at said second angular velocity to provide a second difference signal at respective rotor positions of said rotor whereby order related background noise due to other blades having nonuniformity in angular position on the rotor is reduced, time shifting said first difference signal with respect to said second difference signal so that said first difference signal corresponds to the same respective position on the rotor as said second difference signal, subtracting said first and second difference signals to provide a difference-difference signal whereby order related background noise is further reduced, and comparing the amplitude of said difference-difference signal at respective rotor positions of said rotor with a threshold value whereby amplitudes above said threshold value are indicative of said vibrating blades.

30. The method of claim 29, further including the steps of attenuating said fist difference signal so that the amplitudes of said first and second difference signals are optimized for reducing order-related background noise at times they are subtracted.

31. The method of claim 29, wherein said step of obtaining includes the step of receiving a reference signal from the shaft of the rotor.

32. The method of claim 29, wherein said step of sampling includes the step of further sampling at said first and second angular velocity where said first and second angular velocity are spaced apart by at least one revolution per minute.

33. The method of claim 29, wherein said step of averaging includes the step of further averaging samples over at least one thousand revolutions of said rotor.

34. The method of claim 29, wherein said step of comparing includes the step of determining the rotor position at the peak amplitude of said difference-difference signal at times the difference-difference signal exceeds the threshold value.

35. The method of claim 34, wherein said step of determining includes the step of further determining the frequency of said difference-difference signal at said peak amplitude.

36. The method of claim 35, wherein said step of further obtaining includes the step of additionally determining the instantaneous phase of said difference-difference signal at said peak amplitude.

37. The method of claim 36, wherein said step of further obtaining includes the step of differentiating the instantaneous phase of said difference-difference signal.

38. The method of claim 34, wherein said step of determining includes the step of further obtaining the difference-difference signal in the frequency domain and eleventh means for obtaining the Hilbert Transform of the difference-difference signal in the frequency domain.

39. An apparatus for detecting a non order-related vibrating blade of a rotating rotor in an operating turbine comprising:

an acoustic sensor positioned on a stationary member with respect to said rotor to receive sound waves emanating from said vibrating blade of said rotor as said blade rotates about said rotor axis and to provide an acoustic signal from said receive sound waves, said acoustic sensor positioned with respect to said rotor so that said blade approaches and departs from said acoustic sensor in the course of one rotation of said rotor about said rotor axis thereby imparting a Doppler effect to said received sound waves, first means for obtaining a reference signal indicative of rotor positions at least once each time said rotor completes a revolution about said rotor axis and for determining the angular velocity of said rotor, second means for sampling said acoustic signal to obtain samples as a function of rotor position as said rotor completes a plurality of revolutions at a plurality of angular velocities of said rotor, third means for averaging said samples obtained at respective rotor positions of said rotor revolving at each angular velocity of said plurality of angular velocities and for storing the averaged samples, fourth means for subtracting the averaged samples obtained at respective rotor positions of said rotor revolving at each angular velocity of said plurality of angular velocities from individual samples obtained at respective rotor positions of said rotor revolving at each angular velocity of said plurality of angular velocities to provide a difference signal sample at respective rotor positions of said rotor revolving at said plurality of angular velocities whereby non order-related background noise due to flow noise and non order-related vibrating blades is extracted, fifth means for determining the root mean square (RMS) of a plurality of difference signal samples at respective rotor positions of said rotor revolving at each angular velocity of said plurality of angular velocities to form a root mean square difference sample at respective rotor positions of said rotor revolving at said plurality of angular velocities, sixth means for determining the root means square (RMS) of said root means square difference samples at respective rotor positions of said rotor revolving at each angular velocity of said plurality of velocities to form a root mean square running speed signal, seventh means for subtracting the amplitude of said root mean square running speed signal at each respective angular velocity from the amplitude of said root mean square difference samples at the same corresponding angular velocity to form reduced root mean square difference samples at respective rotor positions and angular velocities, eighth means for averaging over several revolutions said reduced root mean square difference samples at respective rotor positions of said rotor revolving at respective angular velocities, and ninth means for comparing said averaged and reduced root mean square difference samples at respective rotor positions of said rotor revolving at respective angular velocities with a threshold value whereby amplitudes above said threshold value are indicative of said non order-related vibrating blade.

40. The apparatus of claim 39, further including tenth means for providing torsional vibration to said rotor at a predetermined frequency whereby small corresponding vibrations to certain turbine blades are observed for turbine blades having a blade resonance at said frequency.

41. The apparatus of claim 40, wherein said tenth means includes an exciter coupled to the generator sharing the same rotor shaft.

42. The apparatus of claim 41, wherein said exciter is coupled to the field windings of said generator.

43. A method for detecting a non order-related vibrating blade of a rotating rotor in an operating turbine having:

an acoustic sensor positioned on a stationary member with respect to said rotor to receive sound waves emanating from said vibrating blade of said rotor as said blade rotates about said rotor axis and to provide an acoustic signal from said receive sound waves, said acoustic sensor positioned with respect to said rotor so that said blade approaches and departs from said acoustic sensor in the course of one rotation of said rotor about said rotor axis thereby imparting a Doppler effect to said received sound waves comprising the steps of:

first obtaining a reference signal indicative of rotor positions at least once each time said rotor completes a revolution about said rotor axis and for determining the angular velocity of said rotor, second sampling said acoustic signal to obtain samples is a function of rotor position as said rotor completes a plurality of revolutions at a plurality of angular velocities of said rotor, third averaging said samples obtained at respective rotor positions of said rotor revolving at each angular velocity of said plurality of angular velocities and for storing the averaged samples, fourth subtracting the averaged samples obtained at respective rotor positions of said rotor revolving at each angular velocity of said plurality of angular velocities from individual samples obtained at respective rotor positions of said rotor revolving at each angular velocity of said plurality of angular velocities to provide a difference signal sample at respective rotor positions of said rotor revolving at said plurality of angular velocities whereby non order-related background noise due to flow noise and non order-related vibrating blades is extracted, fifth determining the root mean square (RMS) of a plurality of difference signal samples at respective rotor positions of said rotor revolving at each angular velocity of said plurality of angular velocities to form a root mean square difference sample at respective rotor positions of said rotor revolving at said plurality of angular velocities, sixth determining the root means square (RMS) of said root means square difference samples at respective rotor positions of said rotor revolving at each angular velocity of said plurality of velocities to form a root mean square running speed signal, seventh subtracting the amplitude of said root mean square running speed signal at each respective angular velocity from the amplitude of said root mean square difference samples at the same corresponding angular velocity to form reduced root mean square difference samples at respective rotor positions and angular velocities, eighth averaging over several revolutions said reduced root mean square difference samples at respective rotor positions of said rotor revolving at respective angular velocities, and ninth comparing said averaged and reduced root mean square difference samples at respective rotor positions of said rotor revolving at respective angular velocities with a threshold value whereby amplitudes above said threshold value are indicative of said non order-related vibrating blade.

44. The method of claim 43, further including tenth providing torsional vibration to said rotor at a predetermined frequency whereby small corresponding vibration to certain turbine blades are observed for turbine blades having a blade resonance at said frequency.

45. The method of claim 44, wherein said tenth step of providing includes coupling an exciter to the generator sharing the same rotor shaft.

46. The method of claim 45, wherein said step of coupling an exciter includes the step of coupling said exciter to the field windings of said generator.

47. An apparatus for detecting an aerodynamic event in an operating turbine comprising:

an acoustic sensor positioned on a stationary member with respect to said rotor of said turbine to receive sound waves emanating from and near the blades of a blade row of said rotor as said rotor rotates about said rotor axis to provide an acoustic signal from said received sound waves, first means for obtaining a reference signal indicative of rotor positions at least once each time said rotor completes a revolution about said rotor axis and for determining the angular velocity of said rotor, second means for sampling said acoustic signal to obtain samples as a function of rotor position as said rotor completes a plurality of revolutions at a plurality of angular velocities of said rotor, third means for averaging said samples obtained at respective rotor positions of said rotor revolving at each angular velocity of said plurality of angular velocities and for storing the averaged samples, fourth means for subtracting the amplitudes of averaged samples obtained at respective rotor positions of said rotor revolving at each angular velocity of said plurality of angular velocities from individual samples obtained at respective rotor positions of said rotor revolving at each angular velocity of said plurality of angular velocities to provide a difference signal sample at respective rotor positions of said rotor revolving at said plurality of angular velocities whereby non order-related aerodynamic events and background noise due to flow noise and blade vibration is extracted, and to provide an output signal at times said difference signal sample exceeds said predetermined value indicative of an aerodynamic event.

48. A method for detecting an aerodynamic event in an operating turbine having an acoustic sensor positioned on a stationary member with respect to said rotor of said turbine to receive sound waves emanating from and near the blades of a blade row of said rotor as said rotor rotates about said rotor axis to provide an acoustic signal from said received sound waves comprising the steps of:

first obtaining a reference signal indicative of rotor positions at least once each time said rotor completes a revolution about said rotor axis and for determining the angular velocity of said rotor, second sampling said acoustic signal to obtain samples as a function of rotor position as said rotor completes a plurality of revolutions at a plurality of angular velocities of said rotor, third averaging said samples obtained at respective rotor positions of said rotor revolving at each angular velocity of said plurality of angular velocities and for storing the averaged samples, fourth subtracting the amplitudes of averaged samples obtained at respective rotor positions of said rotor revolving at each angular velocity of said plurality of angular velocities from individual samples obtained at respective rotor positions of said rotor revolving at each angular velocity of said plurality of angular velocities to provide a difference signal sample at respective rotor positions of said rotor revolving at said plurality of angular velocities whereby non order-related aerodynamic events and background noise due to flow noise and blade vibration is extracted, and to provide an output signal at times said difference signal sample exceeds said predetermined value indicative of an aerodynamic event.

49. An apparatus for detecting an aerodynamic event of condensation shock in an operating turbine comprising:

a first and second acoustic sensor positioned on a stationary member with respect to the rotor of said turbine to receive sound waves emanating from and near the blades of a blade row of said rotor as said rotor rotates about said rotor axis to provide a first and second acoustic signal from said received sound waves, first means for obtaining a reference signal indicative of rotor positions at least once each time said rotor completes a revolution about said rotor axis and for determining the angular velocity of said rotor, second means for sampling said first and second acoustic signals to obtain samples of said first and second signals respectively as a function of rotor position as said rotor completes a plurality of revolutions at a plurality of angular velocities of said rotor, third means for averaging the said samples of said first and second signals obtained at respective rotor positions of said rotor revolving at each angular velocity of said plurality of angular velocities and for storing the averaged samples of said first and second signals, fourth means for subtracting the averaged samples of said first and second signals obtained at respective rotor positions of said rotor revolving at each angular velocity of said plurality of angular velocities from individual samples obtained at respective rotor positions of said rotor revolving at each angular velocity of said plurality of angular velocities to provide first and second difference signal sample of said first and second signals at respective rotor positions of said rotor revolving at said plurality of angular velocities whereby non order-related aerodynamic events and background noise due to flow noise and blade vibration is extracted, and comparing the amplitude of said first and second difference signal samples of said first and second signals with respective first and second predetermined values, said first and second predetermined values set above said background noise due to flow noise and non order-related blade vibration to provide a first and second output signal at times the amplitude of said first and second difference signal sample exceeds said respective first and second predetermined value, means for comparing the time difference between said first and second output signals whereby a time difference below a third predetermined value is indicative of an aerodynamic event of condensation shock in said turbine.

50. A method for detecting an aerodynamic event of condensation shock in an operating turbine having a first and second acoustic sensor positioned on a stationary member with respect to the rotor of said turbine to receive sound waves emanating from and near the blades of a blade row of said rotor as said rotor rotates about said rotor axis to provide a first and second acoustic signal from said received sound waves comprising the steps of:

first obtaining a reference signal indicative of rotor positions at least once each time said rotor completes a revolution about said rotor axis and for determining the angular velocity of said rotor, second sampling said first and second acoustic signals to obtain samples of said first and second signals respectively as a function of rotor position as said rotor completes a plurality of revolutions at a plurality of angular velocities of said rotor, third averaging the said samples of said first and second signals obtained at respective rotor positions of said rotor revolving at each angular velocity of said plurality of angular velocities and for storing the averaged samples of said first and second signals, fourth subtracting said averaged samples of said first and second signals obtained at respective rotor positions of said rotor revolving at each angular velocity of said plurality of angular velocities from individual samples obtained at respective rotor positions of said rotor revolving at each angular velocity of said plurality of angular velocities to provide first and second difference signal sample of said first and second signals at respective rotor positions of said rotor revolving at said plurality of angular velocities whereby non order-related aerodynamic events and background noise due to flow noise and blade vibration is extracted, fifth comparing the amplitude of said first and second difference signal samples of said first and second signals with respective first and second predetermined values, said first and second predetermined values set above said background noise cue to flow noise and non order-related blade vibration to provide a first and second output signal at times the amplitude of said first and second difference signal sample exceeds said respective first and second predetermined value, and sixth comparing the time difference between said first and second output signals whereby a time difference below a third predetermined value is indicative of an aerodynamic event of condensation shock in said turbine.

51. An apparatus for detecting an aerodynamic event of rotating stall in an operating turbine comprising:

a first and second acoustic sensor positioned on a stationary member with respect to the rotor of said turbine to receive sound waves emanating from and near the blades of a blade row of said rotor as said rotor rotates about said rotor axis to provide a first and second acoustic signal from said received sound waves, first means for obtaining a reference signal indicative of rotor positions at least once each time said rotor completes a revolution about said rotor axis and for determining the angular velocity of said rotor, second means for sampling said first and second acoustic signals to obtain samples of said first and second signals respectively as a function of rotor position as said rotor completes a plurality of revolutions at a plurality of angular velocities of said rotor, third means for averaging said samples of said first and second signals obtained at respective rotor positions of said rotor revolving at each angular velocity of said plurality of angular velocities and for storing the averaged samples of said first and second signals, fourth means for subtracting the averaged samples of said first and second signals obtained at respective rotor positions of said rotor revolving at each angular velocity of said plurality of angular velocities from individual samples obtained at respective rotor positions of said rotor revolving at each angular velocity of said plurality of angular velocities to provide first and second difference signal sample of said first and second signals at respective rotor positions of said rotor revolving at said plurality of angular velocities whereby non order-related aerodynamic events and background noise due to flow noise and blade vibration is extracted, and fifth means for comparing the amplitude of said first and second difference signal samples of said first and second signals with respective first and second predetermined values, said first and second predetermined values set above said background noise due to flow noise and non order-related blade vibration to provide a first and second output signal at times the amplitude of said first and second difference signal sample exceeds said respective first and second predetermined value, means for fifth means for comparing the time difference between said first and second output signals whereby a time difference below a third predetermined value is indicative of an aerodynamic event of condensation shock in said turbine.

52. A method for detecting an aerodynamic event of rotating stall in an operating turbine having
a first and second acoustic sensor positioned on a stationary member with respect to the rotor of said turbine to receive sound waves emanating from and near the blades of a blade row of said rotor as said rotor rotates about said rotor axis to provide a first and second acoustic signal from said received sound waves comprising the steps of:

first obtaining a reference signal indicative of rotor positions at least once each time said rotor completes a revolution about said rotor axis and for determining the angular velocity of said rotor, second sampling said first and second acoustic signals to obtain samples of said first and second signals respectively as a function of rotor position as said rotor completes a plurality of revolutions at a plurality of angular velocities of said rotor, third averaging said samples of said first and second signals obtained at respective rotor positions of said rotor revolving at each angular velocity of said plurality of angular velocities and for storing the averaged samples of said first and second signals, fourth subtracting the averaged samples of said first and second signals obtained at respective rotor positions of said rotor revolving at each angular velocity of said plurality of angular velocities from individual samples obtained at respective rotor positions of said rotor revolving at each angular velocity of said plurality of angular velocities to provide first and second difference signal sample of said first and second signals at respective rotor positions of said rotor revolving at said plurality of angular velocities whereby non order-related aerodynamic events and background noise due to flow noise and blade vibration is extracted, fifth comparing the amplitude of said first and second difference signal samples of said first and second signals with respective first and second predetermined values, said first and second predetermined values set above said background noise due to flow noise and non order-related blade vibration to provide a first and second output signal at times the amplitude of said first and second difference signal sample exceeds said respective first and second predetermined value, and sixth comparing the time difference between said first and second output signals whereby a time difference below a third predetermined value is indicative of an aerodynamic event of rotating stall in a blade row in said turbine.

53. An apparatus for detecting differential nozzle wear between two or more nozzle sections in a high pressure turbine comprising:
a first and second acoustic sensor positioned downstream of a rotating blade row and downstream of respective first and second nozzle sections of a turbine to receive sound waves emanating from said blade row and individual vibrating blades of said blade row rotating as part of a rotor about a rotor axis to provide an acoustic signal from said received sound waves, first means for obtaining a reference signal indicative of rotor position at least once each time said rotor completes a revolution about said rotor axis and for determining the angular velocity of said rotor, second means for sampling said first and second acoustic signals to obtain first and second samples as a function of rotor position as said rotor completes a plurality of revolutions at one of a plurality of angular velocities of said rotor, third means for averaging said first and second samples of said first and second acoustic signals obtained at respective rotor positions of said rotor revolving at said angular velocity, fourth means for phase shifting said second samples of said second acoustic signal whereby said first samples of said first acoustic signal and said second samples of said second acoustic signal correspond to the same place on the rotor, and fifth means for subtracting said first samples of said first acoustic signal from said second samples of said second acoustic signal to provide a difference signal indicative of nozzle wear between said first and second nozzles.

54. A method for detecting differential nozzle wear between two or more nozzle sections in a high pressure turbine having:
a first and second acoustic sensor positioned downstream of a rotating blade row and downstream of respective first and second nozzle sections of a turbine to receive sound waves emanating from said blade row and individual vibrating blades of said blade row rotating as part of a rotor about a rotor axis to provide an acoustic signal from said received sound waves comprising the steps of first obtaining a reference signal indicative of rotor position at least once each time said rotor completes a revolution about said rotor axis and for determining the angular velocity of said rotor, second sampling said first and second acoustic signals to obtain first and second samples as a function of rotor position as said rotor completes a plurality of revolutions at one of a plurality of angular velocities of said rotor, third averaging said first and second samples of said first and second acoustic signals obtained at respective rotor positions of said rotor revolving at said angular velocity, fourth phase shifting said second samples of said second acoustic signal whereby said first samples of said first acoustic signal and said second samples of said second acoustic signal correspond to the same place on the rotor, and fifth subtracting said first samples of said first acoustic signal from said second samples of said second acoustic signal to provide a difference signal indicative of nozzle wear between said first and second nozzles.

55. Apparatus for measuring the order-related torsional resonant shaft vibration of a rotor shaft in an operating turbine comprising:
an acoustic sensor positioned on a stationary member with respect to said rotor to receive sound waves emanating from vibrating blades of said rotor as said blades rotate about said rotor axis and to provide an acoustic signal from said received soundwaves, said acoustic sensor positioned with respect to said rotor so that said blades approach and depart from said acoustic sensor in the course of one rotation of said rotor about said rotor axis thereby imparting a Doppler effect to said received sound waves, first means for obtaining a reference signal indicative of rotor position at least once each time said rotor completes a revolution about said rotor axis and for determining the angular velocity of said rotor, second means for sampling said acoustic signal to obtain samples as a function of rotor position as said rotor completes a plurality of revolutions at a first and at a second angular velocities of said rotor, third means for averaging said samples of said acoustic signal obtained at respective rotor positions of said rotor revolving at said first angular velocity and revolving at said second angular velocity, fourth means for subtracting the averaged samples obtained at respective rotor positions of said rotor revolving at said first and at said second angular velocity to provide a difference signal at respective rotor positions of said rotor whereby order-related background noise due to other blades having nonuniformity in angular position on the rotor is removed, and fifth means for detecting a sine wave modulation in the amplitude of said difference signal as a function of one revolution of said rotor shaft and for providing a signal indicative of torsional resonant shaft vibration of said rotor shaft at times said sine wave modulation is detected.

56. The apparatus of claim 55, wherein said fifth means includes means for taking the Hilbert Transform of said difference signal.

57. A method for measuring the order-related torsional resonant shaft vibration of a rotor shaft in an operating turbine having an acoustic sensor positioned on a stationary member with respect to said rotor to receive sound waves emanating from vibrating blades of said rotor as said blades rotate about said rotor axis and to provide an acoustic signal from said received soundwaves, said acoustic sensor positioned with respect to said rotor so that said blades approach and depart from said acoustic sensor in the course of one rotation of said rotor about said rotor axis thereby imparting a Doppler effect to said received sound waves comprising the steps of:

first obtaining a reference signal indicative of rotor position at least once each time said rotor completes a revolution about said rotor axis and for determining the angular velocity of said rotor, second sampling said acoustic signal to obtain samples as a function of rotor position as said rotor completes a plurality of revolutions at a first and at a second angular velocities of said rotor, third averaging said samples of said acoustic signal obtained at respective rotor positions of said rotor revolving at said first angular velocity and revolving at said second angular velocity, fourth subtracting said averaged samples obtained at respective rotor positions of said rotor revolving at said first and at said second angular velocity to provide a difference signal at respective rotor positions of said rotor whereby order-related background noise due to other blades having nonuniformity in angular position on the rotor is removed, and fifth detecting a sine wave modulation in the amplitude of said difference signal as a function of one revolution of said rotor shaft and for providing a signal indicative of torsional resonant shaft vibration of said rotor shaft at times said sine wave modulation is detected.

58. The apparatus of claim 57, wherein said step of fifth detecting includes the step of sixth taking the Hilbert Transform of said difference signal.

59. In an apparatus for detecting vibrations in a turbine blade, wherein at least one acoustic sensor is positioned in juxtaposition to the blade, thereby obtaining an acoustic signal from the sensor, and wherein spurious noise may interfere with the acoustic signal and its signal-to-noise ratio, the improvement which comprises means for obtaining a difference Doppler effect of the acoustic signal, thereby substantially improving the signal-to-noise ratio of the acoustic signal for substantially improved detection of turbine blade vibration.

60. A method for detecting a vibrating blade of a rotating rotor in an operating turbine having at least one acoustic sensor positioned in juxtaposition to the blade to receive sound waves emanating from the vibrating blade of the rotor comprising the steps of:

obtaining an acoustic signal from the at least one sensor;

obtaining a difference Doppler waveform of the signal; and comparing the difference Doppler waveform with the sound signals such that the signal to noise ratio is improved and the vibrating blade may be detected.

* * * * *